(12) United States Patent
Mizutani

(10) Patent No.: US 8,894,943 B2
(45) Date of Patent: Nov. 25, 2014

(54) CATALYST-CARRYING FILTER

(75) Inventor: Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 755 days.

(21) Appl. No.: 12/398,637

(22) Filed: Mar. 5, 2009

(65) Prior Publication Data

US 2009/0229259 A1   Sep. 17, 2009

(30) Foreign Application Priority Data

Mar. 17, 2008   (JP) ................................. 2008-067654

(51) Int. Cl.
*B01D 53/94* (2006.01)
*F01N 3/035* (2006.01)
*F01N 3/022* (2006.01)

(52) U.S. Cl.
CPC ...... *B01D 53/944* (2013.01); *B01D 2255/9205* (2013.01); *B01D 2255/1021* (2013.01); *B01D 2255/908* (2013.01); *F01N 3/035* (2013.01); *B01D 2255/9022* (2013.01); *B01D 2255/407* (2013.01); *F01N 3/0222* (2013.01)
USPC ....................................................... 422/180

(58) Field of Classification Search
USPC ................................................. 422/180, 177
See application file for complete search history.

(56) References Cited

U.S. PATENT DOCUMENTS

| | | | |
|---|---|---|---|
| 5,100,632 A | 3/1992 | Dettling et al. | |
| 5,114,581 A | 5/1992 | Goldsmith et al. | |
| 5,221,484 A | 6/1993 | Goldsmith et al. | |
| 5,286,699 A | 2/1994 | Ohata et al. | |
| 7,722,829 B2 * | 5/2010 | Punke et al. | 422/180 |
| 2004/0191133 A1 | 9/2004 | Yamaguchi | |
| 2006/0245985 A1 * | 11/2006 | Harada et al. | 422/177 |
| 2007/0234694 A1 | 10/2007 | Miyairi et al. | |
| 2009/0129995 A1 | 5/2009 | Pfeifer et al. | |
| 2009/0247396 A1 | 10/2009 | Mizutani | |

FOREIGN PATENT DOCUMENTS

| | | |
|---|---|---|
| DE | 10 2004 040 548 A1 | 2/2006 |
| EP | 1 512 850 A1 | 3/2005 |
| EP | 2 067 518 A2 | 6/2009 |
| EP | 2 072 129 A2 | 6/2009 |
| JP | B2-07-106290 | 11/1995 |

(Continued)

OTHER PUBLICATIONS

Office Action issued in U.S. Appl. No. 12/398,621 on Aug. 23, 2010.

(Continued)

*Primary Examiner* — Jill Warden
*Assistant Examiner* — Joye L Woodard
(74) *Attorney, Agent, or Firm* — Oliff PLC

(57) ABSTRACT

A catalyst-carrying filter includes a gas-inflow-side layer and a gas-outflow-side layer, the gas-inflow-side layer including a PM collection layer that has a small average pore size and a PM removal catalyst layer that supports or is coated with an oxidizing catalyst, and the gas-outflow-side layer including a gas purification catalyst layer that supports or is coated with a gas purification catalyst. An amount of oxidizing catalyst supported on the PM collection and PM removal catalyst layer is larger than that of the gas purification catalyst layer by a factor of 1.05 to 10 and an amount of noble metal contained in the PM collection and PM removal catalyst layer is smaller than an amount of noble metal contained in the gas purification catalyst layer.

12 Claims, 9 Drawing Sheets

(56) References Cited

FOREIGN PATENT DOCUMENTS

| | | |
|---|---|---|
| JP | A-2000-202220 | 7/2000 |
| JP | A-2001-079321 | 3/2001 |
| JP | A-2001-207836 | 8/2001 |
| JP | A-2002-276338 | 9/2002 |
| JP | A-2002-309921 | 10/2002 |
| JP | A-2003-053121 | 2/2003 |
| JP | A-2003-97250 | 4/2003 |
| JP | Y2-2607898 | 11/2006 |
| JP | A-2007-56736 | 3/2007 |
| JP | A-2007-117954 | 5/2007 |
| JP | A-2007-296512 | 11/2007 |
| WO | WO 99/47238 A1 | 9/1999 |
| WO | WO 2005/014146 A1 | 2/2005 |
| WO | WO 2005/084806 A1 | 9/2005 |

OTHER PUBLICATIONS

Feb. 8, 2010 Office Action issued in U.S. Appl. No. 12/398,621.

* cited by examiner

CATALYST-CARRYING FILTER

BACKGROUND OF THE INVENTION

1. Field of the Invention

The present invention relates to a catalyst-carrying filter that is used to collect or purify particulate matter contained in exhaust gas discharged from an internal combustion engine (e.g., diesel engine) or a combustion apparatus.

2. Description of Related Art

Exhaust gas discharged from an internal combustion engine (e.g., diesel engine) or a combustion apparatus (hereinafter may be collectively referred to as "internal combustion engine or the like") contains a large amount of particulate matter (hereinafter may be referred to as "PM") that mainly contains soot (graphite). When particulate matter is directly discharged to the atmosphere, environmental pollution occurs. Therefore, a filter that collects particulate matter is generally provided in an exhaust gas passage connected to an internal combustion engine or the like.

For example, a honeycomb filter has been utilized for such a purpose. The honeycomb filter includes a honeycomb structure that has a plurality of cells (gas passages) partitioned by a partition wall formed of a porous ceramic having a number of pores, one open end and the other open end of the plurality of cells being alternately plugged by plugging portions. In recent years, a honeycomb filter that carries an oxidizing catalyst for promoting oxidation (combustion) of particulate matter (hereinafter may be referred to as "catalyst-carrying filter") has been used.

For example, a honeycomb filter shown in FIGS. 6 and 7 includes a honeycomb structure that has a plurality of cells 23 (gas passages) partitioned by a partition wall 24 formed of a porous ceramic having a number of pores 25, one open end X and the other open end Y of the plurality of cells being alternately plugged by plugging sections 22. The pores formed in the inflow-side surface of the partition wall are coated with a catalyst. A gas $G_1$ enters the pores formed in the inflow-side surface of the partition wall and is discharged to the adjacent cell through the pores formed in the outflow-side surface of the partition wall. According to this configuration, when exhaust gas is introduced into the inflow cells, particulate matter contained in the exhaust gas is collected by the partition wall when the exhaust gas passes through the partition wall. The exhaust gas from which particulate matter has been removed (i.e., purified gas) is discharged from the outflow cells. Since oxidation (combustion) of particulate matter is promoted by the oxidizing catalyst supported on the surface of the partition wall of the honeycomb filter and the inner surface of the pore formed in the partition wall, the amount of particulate matter contained in the exhaust gas can be reduced so that the exhaust gas can be effectively purified.

When using a catalyst-carrying filter formed of a porous ceramic having an average pore size that ensures that particulate matter contained in exhaust gas can be reliably collected, most of particulate matter contained in exhaust gas is deposited on the surface of the partition wall that faces the exhaust-gas-inflow cell, and does not reach the inside of the pores formed in the partition wall. Specifically, since the oxidizing catalyst supported on the inner surface of the pore formed in the partition wall does not come in contact with particulate matter; the oxidizing catalyst is not effectively utilized. Therefore, since oxidation (combustion) of particulate matter cannot be promoted sufficiently, the amount of particulate matter contained in exhaust gas cannot be reduced. As a result, particulate matter is deposited on the surface of the partition wall that faces the exhaust-gas-inflow cell within a relatively short time. Therefore, the filter must be frequently regenerated (i.e., a process that removes deposited particulate matter by back washing, heating, or the like).

The following documents disclose measures aimed at solving the above-described problems.

Japanese Utility Model Registration No. 2607898 discloses a two-layer structure in which a coating having small pores is provided on the particle inflow side. However, since the two-layer structure disclosed in Japanese Utility Model Registration No. 2607898 is not coated with a catalyst, this structure is not appropriate for purifying PM or unburned gas.

JP-B-07-106290 discloses coating a surface layer with a catalyst layer that contains only a catalyst. However, when the catalyst layer contains only a catalyst, the catalyst flows downstream toward a base material so that the effect of the catalyst layer decreases.

JP-A-2003-53121 discloses a method of producing a ceramic filter in which a porous layer is formed on an inflow-side surface. JP-A-2003-53121 aims at collecting minute dust discharged from a waste incinerator or the like using the porous layer. However, JP-A-2003-53121 is silent about a catalyst. Moreover, the method disclosed in JP-A-2003-53121 is insufficient to reduce a pressure loss due to soot (i.e., improve emission) while improving the regeneration efficiency.

Specifically, the above-mentioned documents do not disclose satisfactory measures against the above-described problems. A method that provides a fiber material on the exhaust gas inflow side has also been disclosed. However, this method suffers from poor durability, and cannot sufficiently solve the above-described problems. Therefore, a further improvement has been desired.

SUMMARY OF THE INVENTION

The present invention was conceived in view of the above-described problems. An object of the present invention is to provide a catalyst-carrying filter that allows the degree of contact between particulate matter and an oxidizing catalyst to be increased by a PM collection layer that supports or is coated with a PM removal catalyst to reliably remove PM, can purify only unburned gas by a gas-outflow-side and its vicinity of partition wall to exhibit an improved catalyst purification performance, and can prevent a deterioration in catalyst. In particular, an object of the present invention is to provide a catalyst-carrying filter that can improve the regeneration efficiency and can reduce a pressure loss due to soot to improve the emission.

According to the present invention, the following DPF can be provided.

[1] A catalyst-carrying filter comprising a honeycomb-structured base material having a plurality of cells that serve as exhaust gas passages and are partitioned by a partition wall formed of a porous ceramic having a number of pores, the partition wall including a gas-inflow-side layer and a gas-outflow-side layer, one open end and the other open end of the plurality of cells being alternately plugged by plugging sections; the gas-inflow-side layer of the partition wall including a PM collection layer that has a small average pore size so as to collect particulate matter, and a PM removal catalyst layer that supports or is coated with an oxidizing catalyst for promoting oxidation of particulate matter contained in exhaust gas; and the gas-outflow-side layer of the partition wall including a gas purification catalyst layer that supports or is coated with a gas purification catalyst that promotes oxidation of unburned gas.

[2] The catalyst-carrying filter according to [1], wherein an amount of oxidizing catalyst supported on the PM removal catalyst layer is larger than that of the gas purification catalyst layer by a factor of 1.05 to 10.

[3] The catalyst-carrying filter according to [1] or [2], wherein a total amount of oxidizing catalyst supported on the PM removal catalyst layer and the gas purification catalyst layer is 15 to 180 g/L.

[4] The catalyst-carrying filter according to any one of [1] to [3], wherein an amount of noble metal contained in the PM removal catalyst layer is smaller than that of the gas purification catalyst layer.

[5] The catalyst-carrying filter according to any one of [1] to [4], wherein the PM removal catalyst layer does not contain a noble metal.

[6] The catalyst-carrying filter according to any one of [1] to [5], wherein an amount of Ce contained in the PM removal catalyst layer is larger than that of the gas purification catalyst layer by a factor of 1.2 to 10.

[7] The catalyst-carrying filter according to any one of [1] to [6], wherein the PM removal catalyst layer is formed by causing a ceramic having an aspect ratio of five or more to be coated with the PM removal catalyst.

[8] The catalyst-carrying filter according to any one of [1] to [7], wherein the PM removal catalyst layer has an average pore size smaller than that of the gas purification catalyst layer.

[9] The catalyst-carrying filter according to any of [1] to [8], wherein the PM removal catalyst layer has an average pore size of 1 to 15 μm.

[10] The catalyst-carrying filter according to any one of [1] to [9], wherein the catalyst-carrying filter is produced by separately coating the PM removal catalyst layer and the gas purification catalyst layer with the PM removal catalyst and the gas purification catalyst.

[11] The catalyst-carrying filter according to any one of [1] to [9], wherein the catalyst-carrying filter is produced by coating the PM removal catalyst layer with the PM removal catalyst from an inlet side, and coating the gas purification catalyst layer with the PM removal catalyst from an outlet side.

[12] The catalyst-carrying filter according to any one of [1] to [9], wherein the catalyst-carrying filter is produced by respectively coating the PM removal catalyst layer and the gas purification catalyst layer with the PM removal catalyst and the gas purification catalyst from an inlet side.

According to the present invention, a catalyst-carrying filter that allows the degree of contact between particulate matter and the oxidizing catalyst by the PM collection layer as a inflow layer that supports or is coated with the catalyst for removing PM contained in exhaust gas to reliably remove PM, and can reliably purify unburned gas contained in exhaust gas from which PM has been removed by the gas purification catalyst layer as a outflow layer to exhibit an improved catalyst purification performance, can be provided. According to the present invention, a deterioration of catalyst can be prevented so that the regeneration efficiency can be improved.

When the gas purification catalyst layer as a outflow layer supports or is coated with an oxidizing catalyst, the total catalyst coating amount that ensures an equal purification performance to be maintained after a durability test can be reduced. Since ashes can be collected by the collection layer, a catalyst-carrying filter that can prevent a deterioration of catalyst in the layer having large pores can be provided.

When the gas purification catalyst layer as gas-outflow-side layer supports or is coated with a NOx catalyst, since the local $O_2$ concentration can be reduced by regeneration of PM deposited on the collection layer, the NOx purification efficiency in the gas-outflow-side layer having large pores can be increased. Moreover, since ashes and sulfur do not reach the NOx catalyst, a deterioration of the NOx catalyst can be suppressed.

DESCRIPTION OF PREFERRED EMBODIMENTS

Figure 1:
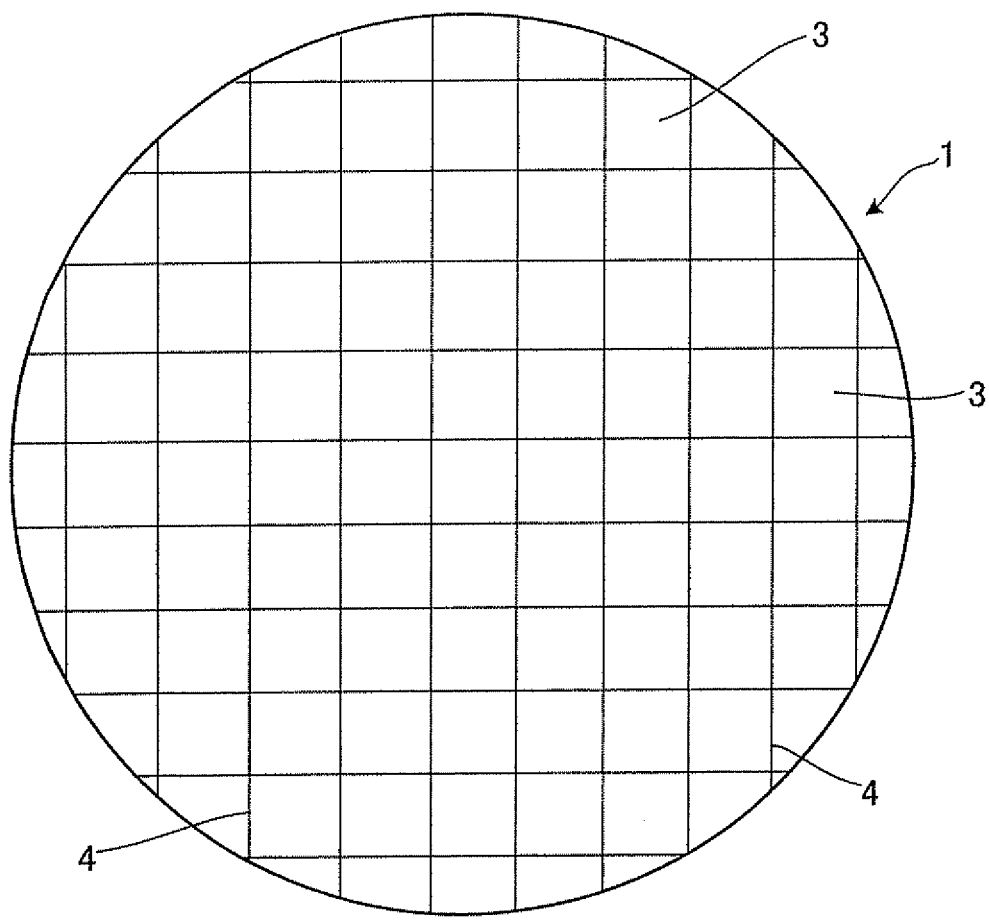
FIG. 1 is a schematic view (plan view) showing a ceramic filter to which one embodiment of the present invention is applied.

Preferred embodiments of the ceramic filter according to the present invention are described in detail below. Note that the present invention is not limited to the following embodiments. The present invention encompasses a wide range of ceramic filters that satisfy the requirements of the present invention.

[1] Catalyst-Carrying Filter

As shown in FIGS. 1 to 5, a catalyst-carrying filter 1 according to the present invention includes a honeycomb-structured base material having a plurality of cells 3 that serve as exhaust gas passages and are partitioned by a partition wall 4 formed of a porous ceramic having a number of pores, the partition wall 4 including a gas-inflow-side layer and a gas-outflow-side layer. One open end 7a and the other open end 7b of the plurality of cells 3 are alternately plugged by plugging sections. The gas-inflow-side layer 13 of the partition wall includes a PM collection layer 9 that has a small average pore size so as to collect particulate matter, and a PM removal catalyst layer 10 that supports or is coated with an oxidizing catalyst for promoting oxidation of particulate matter contained in exhaust gas. The gas-outflow-side layer 15 of the partition wall includes a gas purification catalyst layer 11 that supports or is coated with a gas purification catalyst that promotes oxidation of unburned gas.

[1-1] PM Collection Layer

In the catalyst-carrying filter according to this embodiment, the gas-inflow-side layer of the partition wall includes the PM collection layer that has a small average pore size so as to collect particulate matter (PM) that is contained in exhaust gas and mainly contains soot (graphite). Ashes can be reliably collected by the PM collection layer by reducing the average pore size of the gas-inflow-side layer of the partition wall so that inflow (outflow) of ashes into the gas-outflow-side layer that supports or is coated with the gas purification catalyst can be reliably prevented. As a result, a deterioration in the gas purification catalyst applied to (supported on) the gas-outflow-side layer can be prevented so that the gas purification catalyst can promote oxidation of unburned gas.

Figure 3:
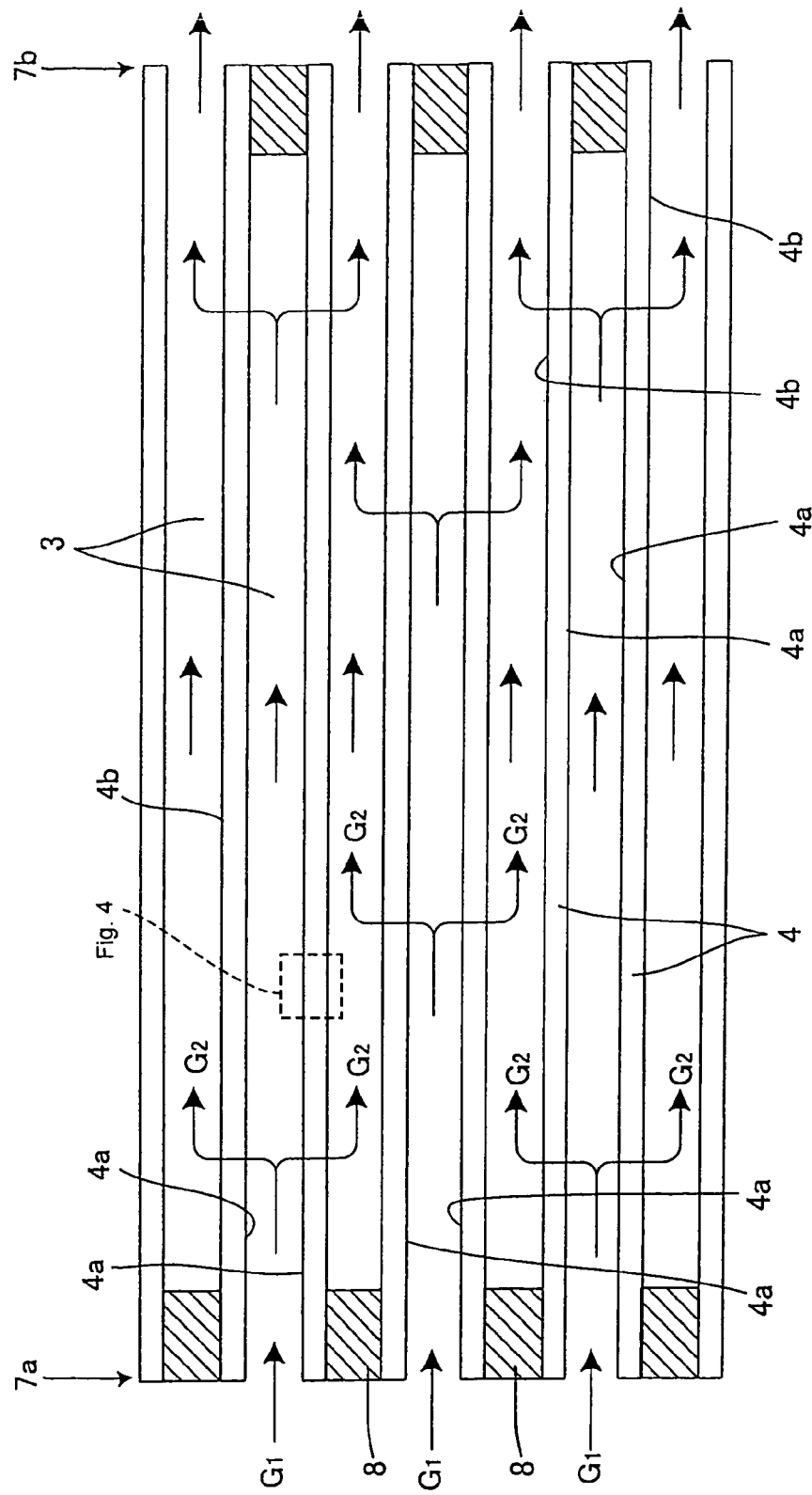
FIG. 3 is a schematic view (cross-sectional view) showing a ceramic filter to which one embodiment of the present invention is applied.

Note that the term "gas-inflow-side layer" refers to an area (PM collection layer 9) that corresponds to the gas-inflow-side partition wall of the honeycomb-structured base material and is formed to have a small average pore size so as to collect particulate matter. Specifically, the term "gas-inflow-side layer" refers to the gas-inflow-side and its vicinity of partition wall 4 (4a), as shown in FIG. 3. The gas-inflow-side layer supports or is coated with the PM removal catalyst described later, and serves as the PM removal catalyst layer (see reference numeral 10 shown in FIG. 4). The term "gas-outflow-side layer" refers to an area that corresponds to the gas-outflow-side partition wall of the honeycomb-structured base material (see reference numeral 15) and is formed in the gas-outflow-side and its vicinity of partition wall. The gas-outflow-side layer corresponds to an area excluding at least the PM collection layer (see symbol 4b). Specifically, the term "gas-outflow-side layer" refers to the gas-outflow-side and its vicinity of partition wall shown in FIG. 4. The gas-outflow-side layer supports or is coated with the gas purification catalyst described later, and serves as the gas purification catalyst layer 11.

Note that the structure of the partition wall of the base material is not limited to the two-layer structure that includes the gas-inflow-side layer and the gas-outflow-side layer. A partition wall that includes three or more layers may be formed by providing an intermediate layer that does not support a catalyst between the gas-inflow-side layer and the gas-outflow-side layer.

Figure 4:
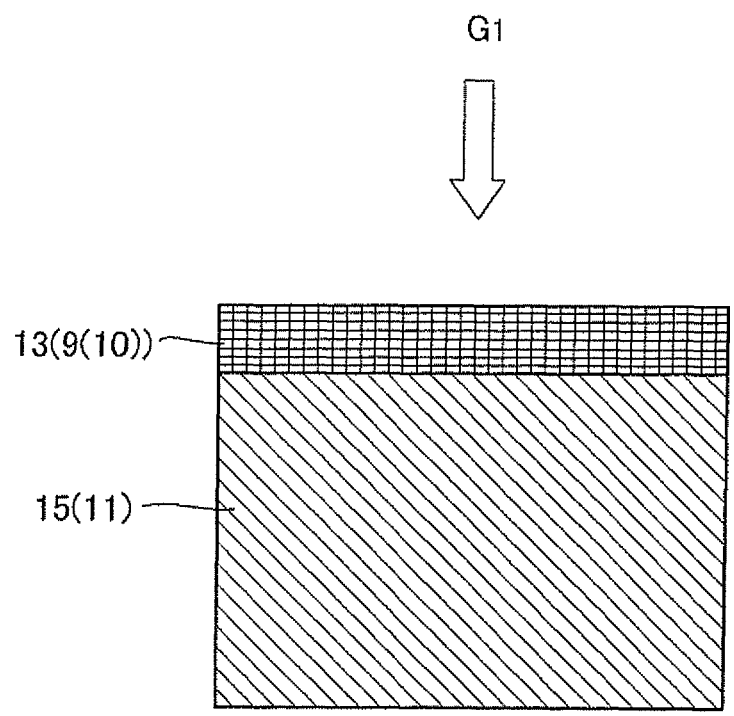
FIG. 4 is a schematic view (cross-sectional view) showing a ceramic filter to which one embodiment of the present invention is applied.

The details are described below with reference to FIGS. 3 and 4. As shown in FIG. 3, the PM collection layer (see FIG. 4) having an average pore size smaller than that of the gas-outflow-side and its vicinity of partition wall 4a is formed in the gas-inflow-side partition wall 4a that partitions the cells 3. The PM removal catalyst is supported on (applied to) the desired area of the PM collection layer 9. The PM removal catalyst layer 10 is supported on (applied to) the gas-inflow-side partition wall 4a. The gas purification catalyst is supported on the gas-outflow-side and its vicinity of partition wall to form the gas purification catalyst layer 11 (see FIG. 4). FIG. 3 is a schematic view showing the longitudinal cross section of the catalyst-carrying filter according to this embodiment, and FIG. 4 is a view schematically showing the cross section of part of the partition wall of the catalyst-carrying filter according to this embodiment.

[1-2] PM Removal Catalyst Layer

The PM removal catalyst layer is formed by causing the PM collection layer to support (be coated with) an oxidizing catalyst (i.e., PM removal catalyst). Specifically, the gas-inflow-side layer of the partition wall of the honeycomb-structured base material according to this embodiment includes roles (functions as) the PM collection layer and a layer that oxidizes PM.

In other words, the gas-outflow-side layer of the partition wall reliably collects and oxidizes PM due to the function of the PM collection layer that is formed in the gas-inflow-side layer (i.e., the surface of the partition wall and the inner wall of the pore formed in the partition wall near the gas inflow side) and collects PM, and the function of oxidizing PM. As a result, the PM removal catalyst layer and the gas purification catalyst layer can significantly improve the regeneration efficiency of the catalyst-carrying filter in a synergistic manner.

[1-2-1] Oxidizing Catalyst

The oxidizing catalyst is supported on (applied to) the PM collection layer to form the PM removal catalyst layer. Therefore, the oxidizing catalyst (i.e., PM removal catalyst) comes in contact with PM in the PM removal catalyst layer to promote oxidation of PM contained in exhaust gas.

As the oxidizing catalyst, a noble metal such as platinum (Pt), palladium (Pd), or rhodium (Rh) is suitably used.

In the catalyst-carrying filter according to the present invention, it is necessary that at least the oxidizing catalyst be supported on the PM removal catalyst layer. Note that other catalysts and a purification material may be further supported on the PM removal catalyst layer. For example, a NOx occlusion catalyst (e.g., alkali metal (e.g., Li, Na, K, or Cs) and alkaline earth metal (e.g., Ca, Ba, or Sr)), a three-way catalyst, a promoter such as cerium (Ce) oxide and/or zirconium (Zr) oxide, a hydrocarbon (HC) adsorbent, and the like may be supported on the PM removal catalyst layer. Note that these materials may be may be supported on the gas purification catalyst layer (described later).

For example, the PM removal catalyst may include Ce and at least one rare earth metal, alkaline earth metal, or transition metal.

The rare earth metal may be selected from Sm, Gd, Nd, Y, Zr, Ca, La, Pr, and the like.

The alkaline earth metal included in the PM removal catalyst may be selected from Mg, Ca, Sr, Ba, and the like.

The transition metal included in the PM removal catalyst may be selected from Mn, Fe, Co, Ni, Cu, Zn, Sc, Ti, V, Cr, and the like.

The method of causing the PM removal catalyst to support the catalyst component such as the oxidizing catalyst or the NOx occlusion catalyst is not particularly limited. For example, the partition wall of the honeycomb structure may be wash-coated with a catalyst solution containing the catalyst component, and heated to a high temperature so that the catalyst component is secured on the partition wall. Alternatively, a ceramic slurry may be caused to adhere to the gas-inflow-side layer of the partition wall of the honeycomb-structured base material using a known ceramic film formation method (e.g., dipping), and dried and fired to form a thin PM removal catalyst layer. The average pore size of the PM removal catalyst layer may be adjusted to the desired value by controlling the grain size and the mixing ratio of aggregate particles in the ceramic slurry, for example. The porosity of the PM removal catalyst layer may be adjusted to the desired value by controlling the grain size of aggregate particles in the ceramic slurry and the amount of pore-forming material, for example. The thickness of the coating layer may be adjusted to the desired value by controlling the concentration of the ceramic slurry and the film formation time, for example. Note that two or more coating layers may be formed.

It is preferable that the catalyst component such as the oxidizing catalyst or the NOx occlusion catalyst be supported on a heat-resistant inorganic oxide having a large specific surface area (e.g., alumina) in advance, and then supported on the partition wall of the honeycomb structure so that the catalyst component is supported in a highly dispersed state.

The PM removal catalyst layer may be formed by causing a catalyst slurry to be supported inside the pores formed in the PM collection layer by applying a known catalyst supporting method (e.g., attraction method), and then drying and firing the catalyst slurry, for example.

[1-3] Gas Purification Catalyst and Gas Purification Catalyst Layer

The gas purification catalyst layer according to this embodiment is a layer that includes a gas purification catalyst and is formed by causing the gas-outflow-side and its vicinity of partition wall to support (be coated with) the gas purification catalyst. The term "exhaust gas purification catalyst" used herein refers to a catalyst component that has a function of purifying exhaust gas, and encompasses any catalyst that promotes purification of a hazardous component (e.g., nitrogen oxide, hydrocarbon, or carbon monoxide) contained in exhaust gas. For example, the term "exhaust gas purification catalyst" encompasses an oxidizing catalyst that catalyzes oxidation of nitrogen oxide (NOx), a three-way catalyst that catalyzes oxidation of nitrogen oxide and reduction of hydrocarbons and carbon monoxide at the same time, and a NOx occlusion catalyst.

When causing the partition wall to support (be coated with) the oxidizing catalyst as the gas purification catalyst, the gas purification catalyst layer is formed in the gas-outflow-side layer of the partition wall as a layer that promotes oxidation of particulate matter contained in exhaust gas. The total amount of catalyst coating used to maintain an equal purification performance during use (hereinafter may be referred to as "total catalyst coating amount") can be reduced by causing the partition wall to support the oxidizing catalyst as the gas purification catalyst. Since ashes are collected by the PM collection layer, a deterioration in the catalyst in the gas purification catalyst layer can be prevented while reducing the total catalyst coating amount.

As the oxidizing catalyst used as the gas purification catalyst, a noble metal such as platinum (Pt), palladium (Pd), or rhodium (Rh) is suitably used.

When the oxidizing catalyst is supported on the catalyst-carrying filter according to the present invention as the gas purification catalyst, other catalysts and a purification material may be further supported on the catalyst-carrying filter. For example, a NOx occlusion catalyst (e.g., alkali metal (e.g., Li, Na, K, or Cs) or alkaline earth metal (e.g., Ca, Ba, or Sr)), a three-way catalyst, a promoter such as cerium (Ce) oxide and/or zirconium (Zr) oxide, a hydrocarbon (HC) adsorbent, and the like may be supported on the gas purification catalyst layer. For example, a NOx occlusion catalyst (e.g., alkali metal (e.g., Li, Na, K, or Cs) or alkaline earth metal (e.g., Ca, Ba, or Sr)), a three-way catalyst, a promoter such as cerium (Ce) oxide and/or zirconium (Zr) oxide, a hydrocarbon (HC) adsorbent, and the like may be supported on the gas purification catalyst layer.

The method of causing the gas purification catalyst layer to support the catalyst component such as the oxidizing catalyst or the NOx occlusion catalyst is not particularly limited. For example, the partition wall of the honeycomb structure may be wash-coated with a catalyst solution containing the catalyst component, and then heated to a high temperature so that the catalyst component is secured on the gas purification catalyst layer. It is preferable that the catalyst component such as the oxidizing catalyst or the NOx occlusion catalyst be supported on a heat-resistant inorganic oxide having a large specific surface area (e.g., alumina) in advance, and then supported on the partition wall of the honeycomb structure so that the catalyst component is supported in a highly dispersed state.

When the gas purification catalyst is a NOx purification catalyst, the gas purification catalyst layer according to this embodiment is formed in the gas-outflow-side layer of the partition wall as a layer that purifies NOx. Specifically, the gas purification catalyst is supported on the gas-outflow-side and its vicinity of partition wall to form a gas purification catalyst layer. When the gas purification catalyst layer is formed by causing the NOx purification catalyst to be supported (applied) as the gas purification catalyst, the local $O_2$ concentration can be reduced by regenerating (oxidizing) PM deposited on the PM collection layer as a gas-inflow-side layer, and the NOx purification efficiency can be increased by the gas purification catalyst layer formed in the gas-outflow-side layer of the partition wall. Moreover, since ashes and sulfur do not enter the gas purification catalyst layer that includes the NOx catalyst, a deterioration in the NOx catalyst can be suppressed.

The NOx purification catalyst may include a metal oxide selected from the group consisting of alumina, zirconia, titanium, and combinations thereof as a coating material.

Examples of the NOx purification catalyst include NOx occlusion-reduction catalysts and NOx selective reduction catalysts.

The term "NOx occlusion-reduction catalyst" refers to a catalyst that occludes NOx when the air/fuel ratio is in a lean state, and reduces the occluded NOx to $N_2$ during a rich spike at given intervals (i.e., when exhaust gas is made fuel-rich). For example, the NOx occlusion-reduction catalyst may be obtained by causing a metal oxide (e.g., alumina, zirconia, or titania) coating material to support a noble metal (e.g., platinum, palladium, or rhodium) and at least one metal selected from the group consisting of alkali metals and alkaline earth metals.

The term "NOx selective reduction catalyst" refers to a catalyst that causes NOx to selectively react with a reduction component in a lean atmosphere to purify NOx. For example, the NOx selective reduction catalyst may be obtained by causing a coating material that contains zeolite or alumina to support at least one metal selected from the group consisting of copper, cobalt, nickel, iron, gallium, lanthanum, cerium, zinc, titanium, calcium, barium, and silver The method of causing the partition wall of the honeycomb structure to support the purification catalyst is not particularly limited. For example, the partition wall of the honeycomb structure may be wash-coated with a catalyst solution containing the catalyst component, and then heated at a high temperature so that the catalyst component is secured on the partition wall. Alternatively, a ceramic slurry may be caused to adhere to the gas-outflow-side layer of the partition wall of the honeycomb-structured base material using a known ceramic film formation method (e.g., dipping), and then dried and fired to form a thin purification catalyst layer. The average pore size of the gas purification catalyst layer may be adjusted to the desired value by controlling the grain size and the mixing ratio of aggregate particles in the ceramic slurry, for example. The porosity of the gas purification catalyst layer may be adjusted to the desired value by controlling the grain size of aggregate particles in the ceramic slurry and the amount of pore-forming material, for example. The thickness of the coating layer may be adjusted to the desired value by controlling the concentration of the ceramic slurry and the film formation time, for example. Note that two or more coating layers may be formed.

It is preferable that the catalyst component such as the three-way catalyst, the oxidizing catalyst, or the NOx occlusion catalyst be supported on a heat-resistant inorganic oxide having a large specific surface area (e.g., alumina) in advance, and then supported on the partition wall of the honeycomb structure so that the catalyst component is supported in a highly dispersed state.

[1-4] Relationship Between PM Removal Catalyst Layer and Gas Purification Catalyst Layer A state in which gas is purified by the PM removal catalyst layer and the gas purification catalyst layer is described in detail below with reference to FIG. 5.

Figure 5:
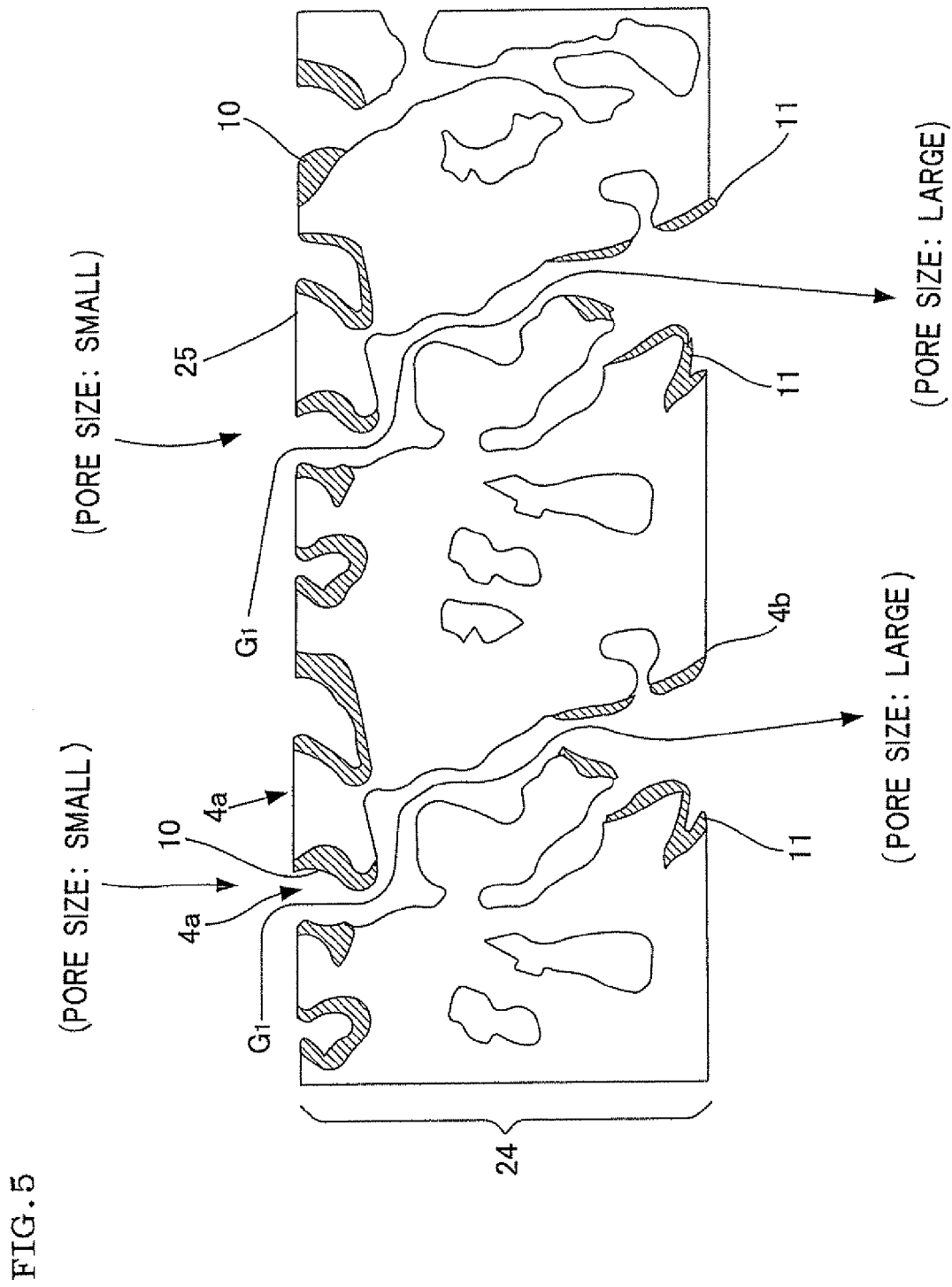
FIG. 5 is a schematic view (cross-sectional view) showing a ceramic filter to which one embodiment of the present invention is applied.
Figure 6:
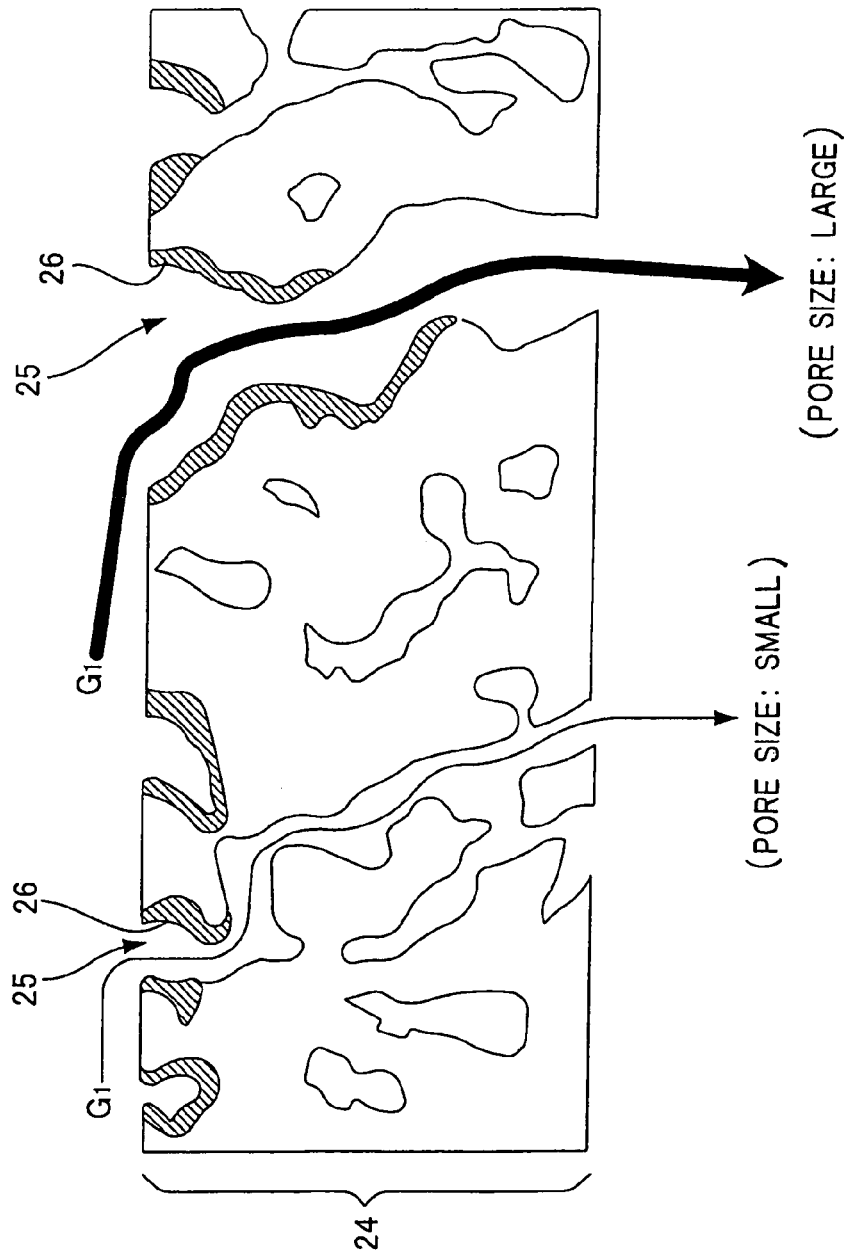
FIG. 6 is a schematic view (enlarged cross-sectional view) showing a related-art ceramic filter.
Figure 7:
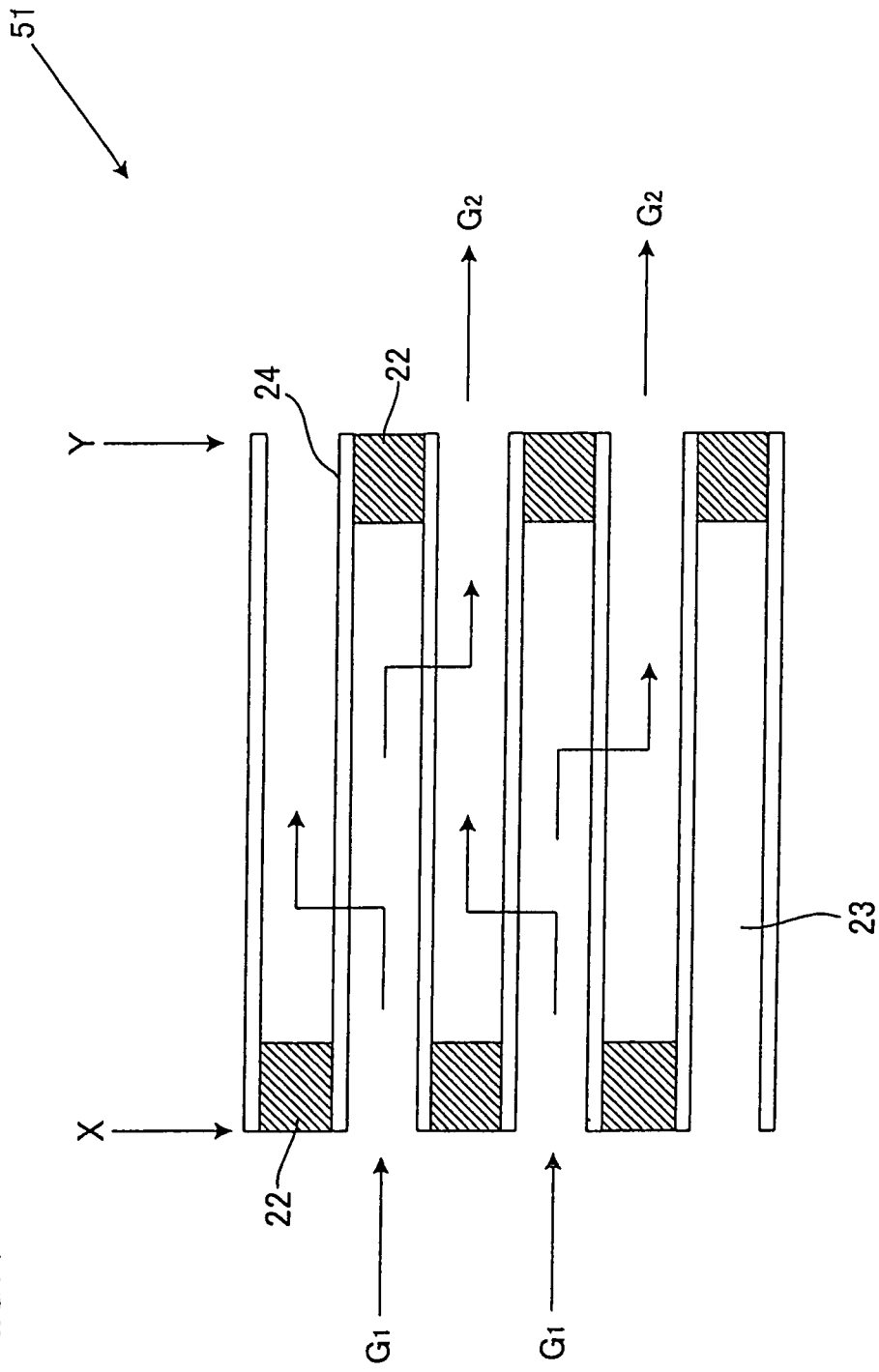
FIG. 7 is a schematic view (cross-sectional view) showing a related-art ceramic filter.

As shown in FIG. 5, the gas $G_1$ enters the cell, flows into the partition wall through the inflow-side partition wall $4a$, and then flows into the outflow-side partition wall $4b$. The inflow-side partition wall $4a$ is coated with the PM removal catalyst layer 10, and the outflow-side partition wall $4a$ is coated with the gas purification catalyst layer 11. Therefore, the PM removal catalyst can reliably contact with in the gas-inflow-side partition wall so that ashes can be collected. Therefore, a deterioration in catalyst provided in the gas-outflow-side and its vicinity of partition wall can be prevented. FIG. 5 is a schematic view (enlarged cross-sectional view) showing the ceramic filter according to the present invention.

It is preferable that the PM removal catalyst layer and the gas purification catalyst layer according to this embodiment have the following features.

It is preferable that the PM removal catalyst layer support (be coated with) the oxidizing catalyst in an amount larger than that of the gas purification catalyst layer. According to this configuration, PM can be reliably removed by the PM removal catalyst layer while suppressing the total amount of catalyst used for the catalyst-carrying filter. Moreover, unburned gas can be reliably oxidized by the gas purification catalyst layer. Specifically, if the amount of oxidizing catalyst is so small that PM is not sufficiently processed by the PM removal catalyst layer, ashes may enter the gas purification catalyst layer. This may cause the catalyst to deteriorate. On the other hand, if the amount of oxidizing catalyst supported on the PM removal catalyst layer is too large, the pores in the PM collection layer (i.e., gas-inflow-side layer) may be clogged so that a pressure loss due to soot is likely to occur. If the total amount of catalyst supported on the catalyst-carrying filter (PM removal catalyst layer and gas purification catalyst layer) is increased to a large extent, cracks and the like may easily occur during regeneration. Therefore, it is preferable to adjust the total amount of catalyst supported on the catalyst-carrying filter It is preferable that the oxidizing catalyst be supported on the PM removal catalyst layer in an amount larger than that of the gas purification catalyst layer by a factor of 1.05 to 10. If the amount of oxidizing catalyst supported on the PM removal catalyst layer is larger than that of the gas purification catalyst layer by a factor of more than 10, the amount of gas purification catalyst supported on the gas-outflow-side layer is too small. As a result, CO produced due to incomplete combustion during soot regeneration is not sufficiently oxidized in the gas-outflow-side layer (gas purification catalyst layer) so that the CO emission cannot be reduced (CO slippage may occur). Therefore, it is preferable to adjust the amount of oxidizing catalyst within the above desired range. Specifically, the PM removal catalyst layer and the gas purification catalyst layer are made to function sufficiently by adjusting the amount of oxidizing catalyst supported on the PM removal catalyst layer and the gas purification catalyst layer within the above desired range so that the regeneration efficiency can be improved. In particular, the effects of the present invention can then be achieved due to the characteristics of each catalyst layer.

It is preferable that the total amount of oxidizing catalyst supported on (applied to) the PM removal catalyst layer and the gas purification catalyst layer be 15 to 180 g/L. If the total amount of oxidizing catalyst is less than 15 g/L, the regeneration efficiency may decrease. Moreover, since the amount of catalyst in the gas-outflow-side layer may become insufficient, the gas emission may not reach 100%. If the total amount of oxidizing catalyst is more than 180 g/L, the pores formed in the gas-inflow-side layer may be clogged by the catalyst so that a pressure loss due to soot may occur. If the amount of pressure loss due to soot increases, the output during acceleration decreases during actual use (impractical).

It is preferable that the amount of noble metal included in the PM removal catalyst layer be smaller than that of the gas purification catalyst layer. Since a noble metal does not contribute to soot regeneration, the amount of noble metal can be reduced to reduce cost.

It is preferable that the PM removal catalyst layer does not include a noble metal. Since a noble metal does not contribute to soot regeneration, the amount of noble metal can be reduced to reduce cost.

It is preferable that Ce be added to the PM removal catalyst layer in an amount larger than that of the gas purification catalyst layer by a factor of 1.2 to 10 (i.e., ceria amount ratio=1.2 to 10). If the ceria amount ratio is less than 1.2, the regeneration efficiency may decrease. If the ceria amount ratio is more than 10, since the amount of oxygen occlusion catalyst in the gas-outflow-side layer decreases to a large extent, the amount of oxygen may be locally insufficient during CO oxidation so that the HC gas emission may become insufficient.

It is preferable that the PM removal catalyst layer be formed by causing a ceramic having an aspect ratio of five or more to be coated with the PM removal catalyst. When causing a ceramic having an aspect ratio of two or more to be coated with the PM removal catalyst, the PM removal catalyst can be easily supported or applied. Therefore, the thickness of the surface layer can be easily made uniform, or collected PM and the like can be easily removed.

It is preferable that the PM collection layer have a small average pore size so as to collect particulate matter. However, it is preferable that the PM collection layer have an average pore size appropriate for collecting particulate matter. Specifically, if the average pore size of the gas-inflow-side layer of the partition wall is too small, the upper part (ash inflow side or its area nearby) of the pores in the PM collection layer may be clogged by ashes when ashes are collected by the PM collection layer. As a result, gas may not reach the gas-outflow-side layer of the partition wall. In this case, oxidation of gas due to the gas purification catalyst supported on the gas-outflow-side layer may be hindered so that the catalyst purification performance decreases. On the other hand, if the average pore size of the gas-inflow-side layer of the partition wall is too large, it is difficult to cause the gas-inflow-side layer to support the PM removal catalyst. Even if the PM removal catalyst layer can be formed by causing the gas-inflow-side layer to support the PM removal catalyst, ashes may not sufficiently come in contact with the PM collection layer (PM removal catalyst). As a result, ashes may reach the gas purification catalyst layer in the gas-outflow-side layer without being sufficiently collected so that gas may not be sufficiently purified. This may result in a decrease in catalyst purification performance.

Specifically, it is preferable that an appropriate amount of oxidizing catalyst (PM removal catalyst) be supported on (applied to) the PM removal catalyst layer. When an appropriate amount of PM removal catalyst is supported on (applied to) the PM removal catalyst layer, PM can be sufficiently collected. Moreover, the gas purification catalyst layer fulfills its function sufficiently.

When the average pore size of the PM removal catalyst layer is smaller than that of the gas purification catalyst layer, even if a defect (pore having a large pore size) is present in the partition wall, a situation in which exhaust gas is concentrated on the defect can be prevented. Moreover, a situation in which particulate matter leaks through the defect toward the gas-outflow-side cells can be prevented.

When the area of the gas inflow (inlet) side is small and the area of the gas outflow (outlet) side is large, the gas permeability increases. Therefore, a large amount of particulate matter contained in exhaust gas G easily and sufficiently comes in contact with the gas-inflow-side catalyst layer so that the PM purification performance can be improved. The unburned gas purification efficiency in the outflow-side gas purification catalyst layer can be improved by improving the PM purification performance. Moreover, a deterioration in catalyst can be prevented.

As shown in FIGS. 3 to 5, the PM collection layer having an average pore size smaller than that of the gas-outflow-side and its vicinity of partition wall is formed on the surface of the gas-inflow-side and its vicinity of partition wall 4 that partitions the plurality of cells of the honeycomb structure, for example. In FIGS. 3 and 4, the pores and the oxidizing catalyst are omitted.

The average pore size of the PM collection layer is preferably 1 to 15 μm. If the average pore size is less than 1 μm, the permeability decreases so that the permeation resistance of the pores tends to increase rapidly. If the average pore size is more than 15 μm, the collection performance decreases so that the PM emission may exceed the Euro-5 regulation value. Therefore, the effects of the present invention can be achieved by adjusting the average pore size of the PM collection layer within the above desired range.

The term "permeability" used herein refers to a value calculated by the following expression (1). The term "permeability" refers to an index that indicates the passage resistance when a specific gas passes through a sample (partition wall). In the expression (1), C indicates the permeability ($m^2$), F indicates the gas flow rate ($cm^3/s$), T indicates the thickness (cm) of the sample, V indicates the gas viscosity (dynes·sec/$cm^2$), D indicates the diameter (cm) of the sample, and P indicates the gas pressure (PSI). In the expression (1), 13.839 PSI equals 1 atm, and 68947.6 dynes·sec/$cm^2$ equals 1 PSI.

$$C = \frac{8FTV}{\pi D^2 (P^2 - 13.839^2)/13.839 \times 68947.6} \times 10^{-4} \quad (1)$$

Figure 9:
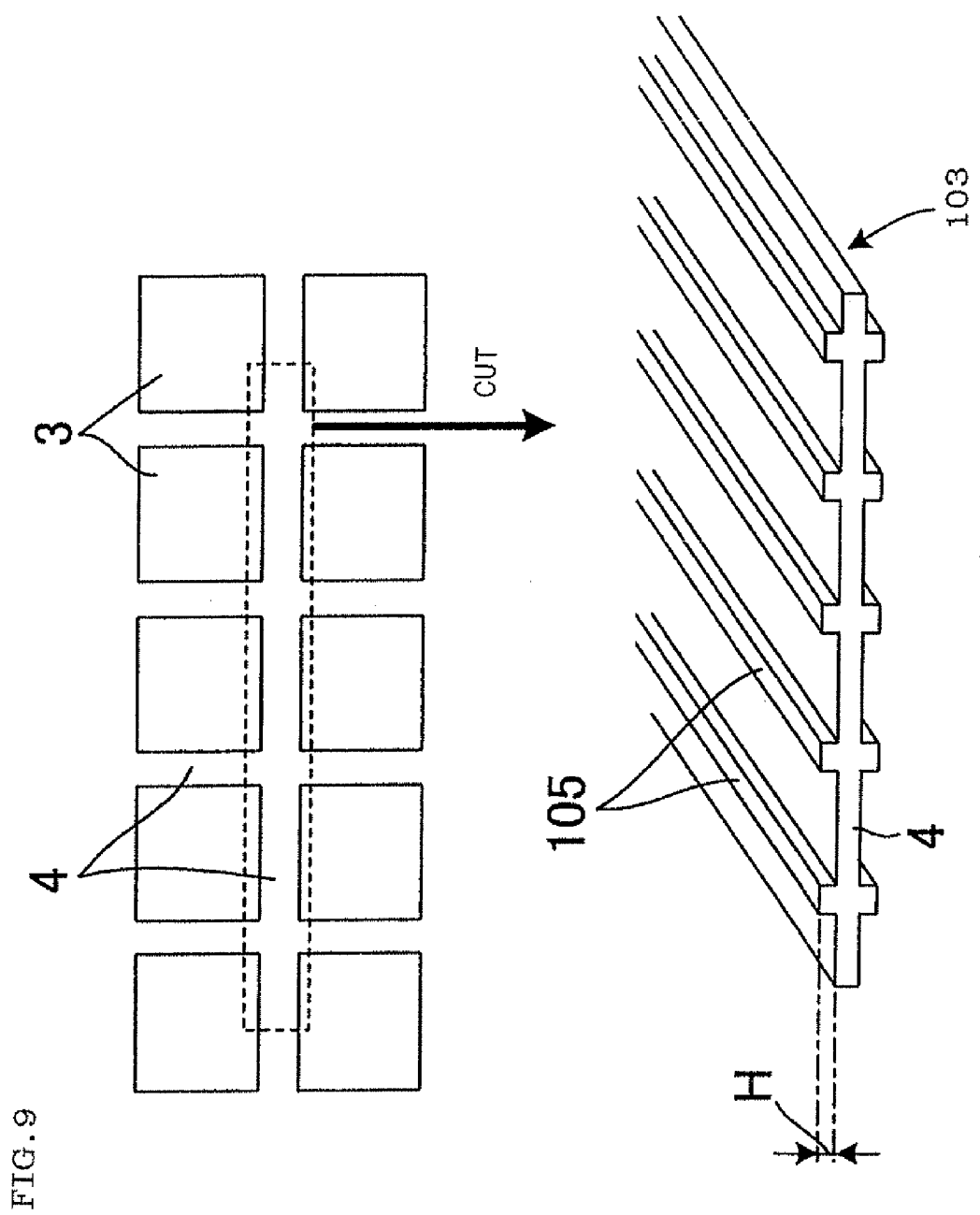
FIG. 9 is a schematic view illustrative of a specimen used for permeability measurement.

The permeability is calculated as follows. As shown in FIG. 9, a honeycomb structure or a honeycomb-structured catalyst body is cut into a rectangular or disc-like specimen 103 so that the rib height H is 0.2 mm or less. The passage resistance when causing air at room temperature to pass through the partition wall 4 is measured, and the permeability is calculated by the expression (1). It is desirable to use a fluid seal (e.g., grease) so that air does not leak through an opening between a rib 105 and a seal. The flow rate of air is adjusted so that air passes through the partition wall at a flow rate of 0.1 cm/sec or more and 1 cm/sec or less. In the honeycomb-structured catalyst body, the catalyst coating layer is provided on the cell inner wall and the rib in a different way. In the present invention, since a large amount of catalyst adheres to the inner surface of the pore in the partition wall (i.e., the effect of the rib is small), the permeability of the partition wall of the honeycomb-structured catalyst body can be measured in the same manner as the honeycomb structure.

The terms "average pore size" and "porosity" used herein respectively refer to the average pore size and the porosity measured by mercury porosimetry.

It is preferable that the PM removal catalyst layer have a porosity of 40 to 90%, and more preferably 50 to 80%. If the porosity of the PM removal catalyst layer is less than 40%, a pressure loss may increase. If the porosity of the PM removal catalyst layer is more than 90%, since the strength of the PM removal catalyst layer may become insufficient, the PM removal catalyst layer may be removed from the surface of the partition wall. If the porosity of the PM removal catalyst layer is less than 40%, since a large amount of particulate matter is deposited, filter regeneration becomes difficult. If the porosity of the PM removal catalyst layer is more than 90%, since the strength of the honeycomb structure that forms the catalyst-carrying filter decreases, canning becomes difficult.

When the porosity of the PM removal catalyst layer is higher than the porosity of the porous ceramic that forms the partition wall by 5% or more, a pressure loss (permeation pressure loss) in the PM removal catalyst layer can be reduced.

It is preferable that the gas purification catalyst layer have a porosity of 30 to 70%, and more preferably 35 to 60%. If the porosity of the gas purification catalyst layer is less than 30%, a pressure loss may increase. Moreover, PM may not sufficiently come in contact with the oxidizing catalyst in the PM removal catalyst layer formed in the gas inflow area of the cell. If the porosity of the gas purification catalyst layer is more than 70%, since the strength of the gas purification catalyst layer may become insufficient, the PM removal catalyst layer may be removed from the surface of the partition wall.

[1-5] Honeycomb Structure

Figure 2:
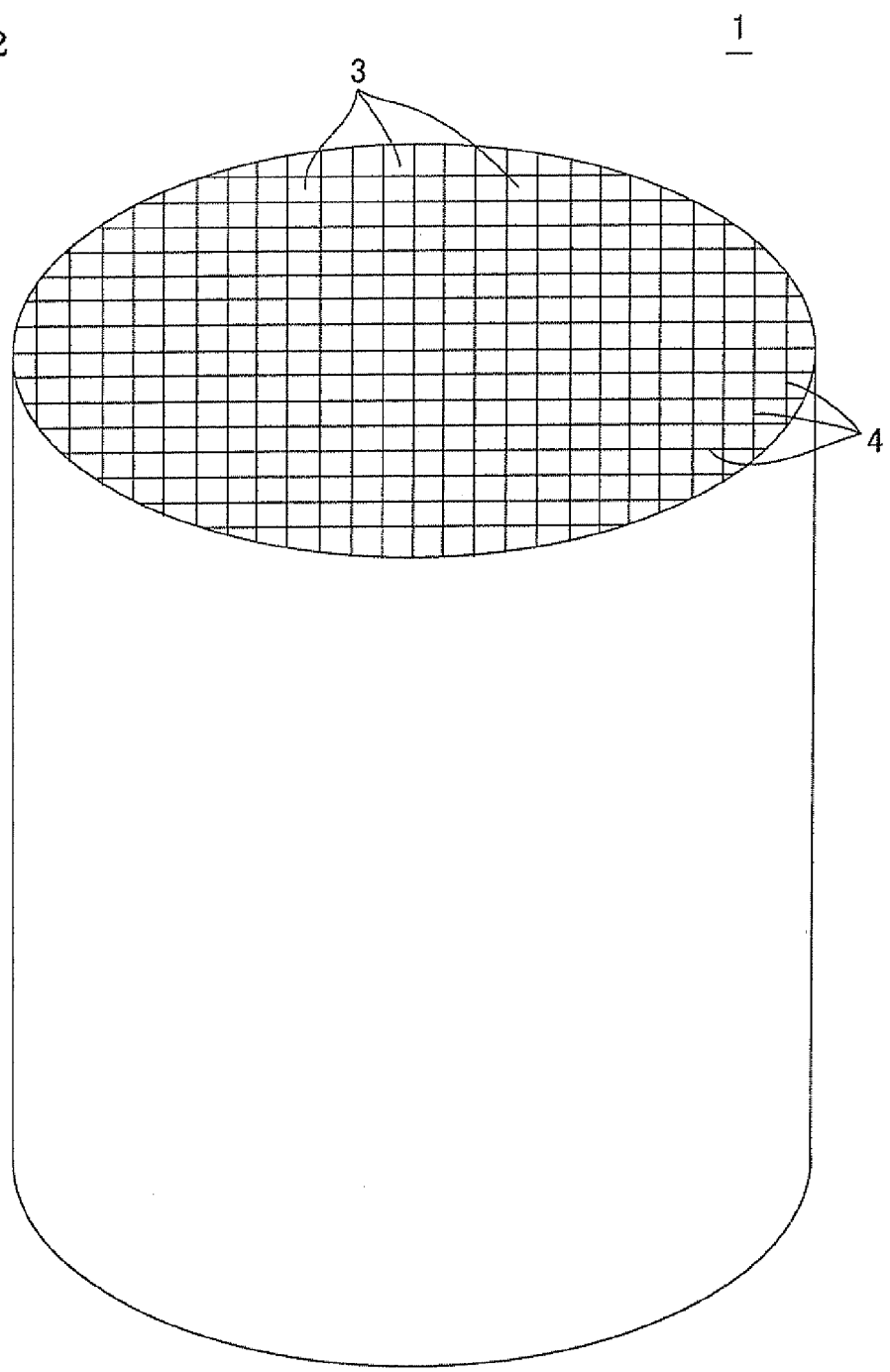
FIG. 2 is a schematic view (perspective view) showing a ceramic filter to which one embodiment of the present invention is applied.

As shown in FIGS. 1 to 3, the honeycomb-structured base material according to this embodiment has a plurality of cells (exhaust gas passages) partitioned by the partition wall 4 formed of a porous ceramic having a number of pores. The honeycomb-structured base material is configured as a catalyst-carrying filter in which the partition wall 4 that partitions the cells 3 includes the gas-inflow-side layer 13 and the gas-outflow-side layer 15. One open end 7a and the other open end 7b of the cells are alternately plugged by the plugging sections. Note that the overall shape of the honeycomb structure is not particularly limited. For example, the honeycomb structure may have a cylindrical shape (see FIGS. 1 and 2), a quadrangular prism shape, a triangular prism shape, or the like.

The shape of the cell of the honeycomb-structured base material (i.e., the shape of the cell in the cross section perpendicular to the cell formation direction) may be quadrilateral (see FIG. 1), hexagonal, triangular, or the like. Note that the shape of the cell is not limited thereto, but may be an arbitrary known shape. The shape of the cell is preferably circular or polygonal having four or more sides. Specifically, since the catalyst is not concentrated on the corner in the cross section of the cell, the thickness of the catalyst layer can be made uniform. A hexagonal cell is particularly preferable taking account of the cell density, the aperture ratio, and the like.

The cell density of the honeycomb-structured base material is not particularly limited. When using the honeycomb-structured base material as the catalyst-carrying filter according to this embodiment, the cell density is preferably 6 to 1500 cells/$in^2$ (0.9 to 233 cells/$cm^2$). The thickness of the partition wall is preferably 20 to 2000 μm.

When using the honeycomb-structured base material as the catalyst-carrying filter according to this embodiment, it is preferable that one open end and the other open end of the cells of the honeycomb-structured base material be alternately plugged. As shown in FIG. 3, the honeycomb structure that has a plurality of cells 3 (exhaust gas passages) partitioned by the partition wall 4 formed of a porous ceramic having a number of pores is formed to have a structure in which one open end 7a and the other open end 7b of the cells 3 are alternately plugged by the plugging sections 8, for example. According to this honeycomb structure, when exhaust gas $G_1$ has flowed into the exhaust gas inflow cells 3 that open toward the exhaust-gas-inflow-side end face 7a, particulate matter contained in the exhaust gas $G_1$ is collected by the partition wall 4 when the exhaust gas G1 passes through the partition wall 4, and purified gas $G_2$ from which particulate matter has been removed flows out from purified gas outflow cells 3 that open toward the exhaust-gas-outflow-side end face 7b.

The material for the honeycomb-structured base material is not particularly limited. A ceramic may be suitably used as the material for the honeycomb-structured base material. It is preferable to use cordierite, silicon carbide, alumina, mullite, or silicon nitride from the viewpoint of strength, heat resistance, corrosion resistance, and the like.

The honeycomb-structured base material may be produced by mixing and kneading ceramic aggregate particles and water optionally with an organic binder (e.g., hydroxypropoxylmethyl cellulose or methyl cellulose), a pore-forming material (e.g., graphite, starch, or synthetic resin), a surfactant (e.g., ethylene glycol or fatty acid soap), and the like to prepare clay, forming the clay to the desired shape, drying the formed clay to obtain a formed body, and firing the formed body, for example.

The honeycomb structure may be produced as follows. Note that the method of producing the honeycomb structure is not limited thereto.

Figure 8:
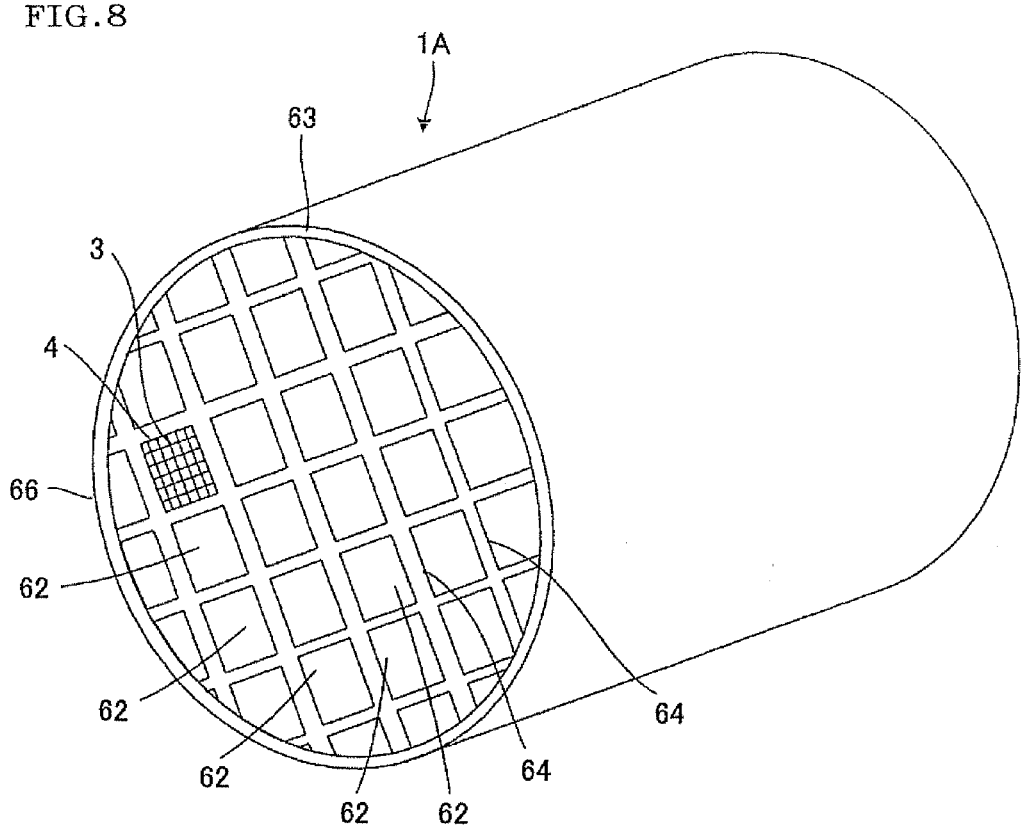
FIG. 8 is a schematic view (perspective view) showing a ceramic filter to which one embodiment of the present invention is applied.

For example, when the honeycomb structure is a honeycomb segment bonded body 63 that includes a plurality of honeycomb segments 62 (see FIG. 8), and is produced by bonding the honeycomb segments 62 through a bonding material 64 and cutting the outer circumferential surface to the desired shape, the honeycomb structure may be produced as follows.

The honeycomb segment is produced. Specifically, a SiC powder and a Si metal powder are mixed in a mass ratio of 80:20. After the addition of methyl cellulose, hydroxypropoxylmethyl cellulose, a surfactant, and water, the components are kneaded to obtain plastic clay. The clay is extruded using a specific die to obtain a honeycomb segment formed body having the desired shape. The resulting honeycomb segment formed body is dried using a microwave dryer, completely dried using a hot-blast dryer, plugged, and calcined.

The honeycomb segment formed body is calcined for degreasing at 550° C. for about three hours in an oxidizing atmosphere, for example. Note that the calcining conditions are preferably adjusted corresponding to the organic substance (e.g., organic binder, dispersant, and pore-forming material) in the honeycomb formed body. The combustion temperature of the organic binder is normally about 100 to 300° C., and the combustion temperature of the pore-forming material is normally about 200 to 800° C. Therefore, the calcining temperature may be set at about 200 to 1000° C. The calcining time is normally about 3 to 100 hours.

The honeycomb segment formed body is then fired. The term "firing" refers to sintering the forming raw material contained in the calcined body to effect densification so that the resulting body has specific strength. The firing conditions (temperature and time) differ depending on the type of forming raw material. The firing conditions may be appropriately selected corresponding to the type of forming raw material. For example, when firing the honeycomb segment formed body in an inert atmosphere (argon), the firing temperature is generally set at about 1400 to 1500° C., for example.

The PM collection layer is then formed on the gas-inflow-side wall (i.e., gas-inflow-side layer). The PM collection layer is formed by immersing the honeycomb segment in a slurry that contains a silicon carbide powder, and firing (firing for forming the PM collection layer) the honeycomb segment. The average particle diameter of the silicon carbide powder contained in the slurry is preferably 0.3 to 5 µm. The silicon carbide powder is preferably dispersed in a dispersion medium (e.g., organic polymeric material). The viscosity of the slurry is preferably adjusted to about 50,000 cp. The firing temperature is preferably about 1400 to 1500° C. The PM collection layer in the gas-inflow-side layer and the gas-outflow-side layer are formed in this manner. Each layer is coated with a catalyst in a catalyst supporting step described later A plurality of honeycomb segments (sintered bodies) having the desired dimensions are obtained by the above-mentioned steps. A bonding slurry prepared by mixing aluminosilicate fibers, colloidal silica, polyvinyl alcohol, and silicon carbide is applied to the periphery of each honeycomb segment. The honeycomb segments are then compression-bonded and dried with heating to obtain a honeycomb segment bonded body having a quadrangular prism shape. The honeycomb segment bonded body is ground to a cylindrical shape. The periphery of the resulting body is coated with a peripheral coating layer formed of the same material as the honeycomb segment formed body. The peripheral coating layer is then dried and cured to obtain a cylindrical honeycomb structure having a segmented structure.

The plugging section is formed as follows. Specifically, a plugging slurry is stored in a storage container. The end face of the honeycomb structure provided with a mask is immersed in the plugging slurry contained in the storage container so that the openings of the cells that are not provided with the mask are filled with the plugging slurry to form plugging sections. The other ends of the cells that are plugged on one end are masked and plugged in the same manner as described above to form plugging sections. As a result, the other ends of the cells are alternately plugged in a checkered pattern. The cells may be plugged after firing the honeycomb formed body to form a honeycomb fired body.

The same material as the raw material for the honeycomb segment is preferably used as the plugging material. In this case, since the plugging material and the honeycomb segment have the same expansion coefficient during firing, the durability of the honeycomb structure can be increased.

For example, when using cordierite as the material for the partition wall, a dispersion medium (e.g., water), a pore-forming material an organic binder, and a dispersant are added to a cordierite-forming raw material. The mixture is kneaded to prepare clay. The clay may be prepared by kneading the cordierite-forming raw material (forming raw material) using a kneader, a vacuum kneader, or the like. The cordierite raw material is preferably fired at 1410 to 1440° C. for about 3 to 10 hours.

The clay thus prepared may be extruded using a die having the desired cell shape, partition wall thickness, and cell density, for example.

[2-1] First Production Method

According to one embodiment of the method of producing the catalyst-carrying filter according to the present invention, the catalyst-carrying filter is preferably produced by separately coating the honeycomb structure with the PM removal catalyst and the gas purification catalyst. This facilitates the forming process so that uniform products can be obtained.

Specifically, a honeycomb structure (that has been bonded and processed) in which the PM collection layer is formed on the gas-inflow-side (gas-inflow-side layer) of the partition wall is provided.

A slurry of an oxidizing catalyst (PM removal catalyst applied to the gas-inflow-side layer of the partition wall of the honeycomb structure) and a slurry of a gas purification catalyst are prepared. The outflow-side cells of the honeycomb structure (i.e., the PM collection layer is not applied) are immersed in the slurry of the purification catalyst to a specific depth. The slurry is absorbed through the inflow-side cells (i.e., the PM collection layer is applied) for a specific time while adjusting the absorption pressure and the absorption flow rate so that the gas purification catalyst is supported on the gas-outflow-side layer. The honeycomb structure is then dried at 120° C. for two hours, and the gas purification catalyst is secured on the honeycomb structure at 550° C. for one hour. The inflow-side cells of the honeycomb structure are immersed in the slurry of the PM removal catalyst to a specific depth. The slurry is absorbed through the outflow-side cells for a specific time while adjusting the absorption pressure and the absorption flow rate so that the PM removal catalyst is supported on the PM collection layer. The honeycomb structure is then dried at 120° C. for two hours, and the PM removal catalyst is secured on the honeycomb structure at 550° C. for one hour. A catalyst-carrying filter is thus obtained.

According to this embodiment of the method of producing the catalyst-carrying filter, the honeycomb structure is separately coated with the PM removal catalyst and the gas purification catalyst. Note that the method of coating the honeycomb structure with the PM removal catalyst and the gas purification catalyst is not limited thereto. A known method may also be used. For example, a dipping method, an absorption method, or the like may be used.

The catalyst composition may be alumina:platinum:ceria material=7:1:2. The ceria material may have a composition of Ce:Zr:Pr:YMn=60:20:10:5:5.

[2-2] Second Production Method

According to another embodiment of the method of producing the catalyst-carrying filter, the catalyst-carrying filter is more preferably produced by coating the honeycomb structure with the PM removal catalyst through the inflow side, and coating the honeycomb structure with the gas purification catalyst through the outflow side. According to this production method, the PM removal catalyst can be reliably supported on the gas-inflow-side layer, and the gas purification catalyst can be reliably supported on the gas-outflow-side layer. Therefore, a variation in products can be minimized.

The second production method is described in detail below. The second production method differs from the first production method as to only the method of causing the catalyst to be supported on the honeycomb structure. Therefore, the following description focuses on the method of causing the catalyst to be supported on the honeycomb structure. The remaining production steps are omitted as much as possible. Regarding the remaining production steps, refer to the first production method and the method of producing the honeycomb structure described above.

In the second production method, a honeycomb structure (that has been bonded and processed) in which the PM collection layer is formed in the gas-inflow-side layer of the partition wall is provided in the same manner as in the first production method. A slurry of an oxidizing catalyst (PM removal catalyst) and a slurry of a gas purification catalyst are prepared. The catalyst composition may be the same as that used in the first production method.

The outflow side cells of the honeycomb structure (i.e., the PM collection layer is not applied) are immersed in the slurry of the purification catalyst to a specific depth. The slurry is absorbed through the inflow-side cells (i.e., the PM collection layer is applied) for a specific time while adjusting the absorption pressure and the absorption flow rate so that the gas purification catalyst is supported on the gas-outflow-side layer. The honeycomb structure is then dried at 120° C. for two hours. The inflow-side cells of the honeycomb structure are then immersed in the slurry of the PM removal catalyst to a specific depth. The slurry is absorbed through the outflow-side cells for a specific time while adjusting the absorption pressure and the absorption flow rate so that the PM removal catalyst is supported on the PM collection layer. The honeycomb structure is then dried at 120° C. for two hours, and the PM removal catalyst is secured on the honeycomb structure at 550° C. for one hour. A catalyst-carrying filter is thus obtained.

[2-3] Third Production Method

According to another embodiment of the method of producing the catalyst-carrying filter, the catalyst-carrying filter is most preferably produced by coating the honeycomb structure with the PM removal catalyst and the gas purification catalyst through the inflow side. According to this production method, the forming process can be simplified so that the production speed can be increased. Therefore, the production cost can be reduced.

The third production method is described in detail below. The third production method differs from the first production method as to only the method of causing the catalyst to be supported on the honeycomb structure. Therefore, the following description focuses on the method of causing the catalyst to be supported on the honeycomb structure. The remaining production steps are omitted as much as possible. Regarding the remaining production steps, refer to the first production method.

In the third production method, the relationship between the amount of oxidizing catalyst supported on the gas-outflow-side layer and the amount of catalyst supported on the PM collection layer is controlled only when the PM removal catalyst and the gas purification catalyst are the same oxidizing catalyst, but differ in the amount of oxidizing catalyst supported on the respective layers. Specifically, a honeycomb structure (that has been bonded and processed) in which the PM collection layer is formed in the gas-inflow-side layer of the partition wall is provided in the same manner as in the first production method. A slurry of an oxidizing catalyst (PM removal catalyst and gas purification catalyst) is prepared. The honeycomb structure is gradually immersed in the slurry from the gas-inflow-side end face, and completely immersed in the slurry. The absorption pressure from the gas outflow side is adjusted so that the slurry is uniformly distributed in the pores in the gas-inflow-side layer and the gas-outflow-side layer. The honeycomb structure is then dried at 120° C. for two hours, and the catalyst is secured on the honeycomb structure at 550° C. for one hour. A catalyst-carrying filter is thus obtained.

EXAMPLES

The present invention is further described below by way of examples. Note that the present invention is not limited to the following examples. In the examples and comparative examples, "part" and "%" respectively refer to "part by mass"

and "mass %" unless otherwise indicated. In the examples and comparative examples, properties were evaluated and measured by the following methods.

[1] DPF

In the examples and comparative examples, a catalyst-carrying filter was produced using a honeycomb structure described below.

A honeycomb structure (i.e., base material of catalyst-carrying filter) was produced as follows. A mixed powder of 80 mass % of a SiC powder and 20 mass % of a Si metal powder was used as the raw material. Methyl cellulose, hydroxypropoxylmethyl cellulose, a surfactant, and water were added to the mixed powder to prepare plastic clay. The clay was extruded using an extruder to obtain sixteen (4×4) honeycomb segments having the desired dimensions. The honeycomb segments were dried using microwaves and a hot blast, plugged on either end of the cells in a checkered pattern, and calcined (for degreasing) at 550° C. for three hours in an oxidizing atmosphere. The honeycomb segments were fired at 1700° C. for two hours in an inert atmosphere (argon) to obtain a plurality of honeycomb segments (sintered bodies) in which SiC crystal particles are bonded through Si. A bonding slurry was applied to the periphery of each honeycomb segment (sintered body). The honeycomb segments were compression-bonded and dried with heating to obtain a honeycomb segment bonded body in the shape of a quadrangular prism. The honeycomb segment bonded body was ground to a cylindrical shape. The periphery of the resulting body was coated with a peripheral coating layer formed of the same material as the honeycomb segment formed body. The peripheral coating layer was dried and cured to obtain a honeycomb structure (144×152 mm, 12 mil/300 cpsi). The thickness of the gas-inflow-side partition wall as a PM collection layer was 50 μm. The thickness of the gas-outflow-side and its vicinity of the partition wall was 305 μm (=12 mil). A collection layer having a thickness of 50 μm was formed on the gas-outflow-side layer having the wall thickness of 305 μm. The honeycomb structure was then dried at 120° C. for two hours, and the catalyst was secured on the honeycomb structure at 550° C. for one hour to produce a honeycomb-structured silicon carbide sintered body (SiC-DPF).

[2] Catalyst

An oxidizing catalyst was used. The partition wall of the above-mentioned SiC-DPF was wash-coated with a catalyst solution containing an oxidizing catalyst component at the desired location and amount corresponding to the examples and comparative examples, and heated at a high temperature to obtain a catalyst-carrying filter.

The composition of a catalyst A was alumina:platinum:ceria material=7:1:2 (ceria material had a composition of Ce:Zr:Pr:Y:Mn=60:20:10:5:5). A catalyst B (B-1 to B-5) and a catalyst C (C-1 to C-5) were prepared so that the ceria amount ratio differed from that of the catalyst A (the total catalytic amount was identical with that of the catalyst A) (see Table 1). A catalyst D (D-1 to B-3) and a catalyst E (E-1 to E-3) were prepared so that the platinum ratio differed from that of the catalyst A (the total catalytic amount was identical with that of the catalyst A) (see Table 1). The details are shown in Examples 1 to 14 and Comparative Examples 1 to 10.

The catalyst was supported on the gas purification layer by absorbing the catalyst slurry from the outflow-side end face. The catalyst was supported on the PM collection layer by absorbing the catalyst slurry from the inflow-side end face. The honeycomb structure was then dried at 120° C. for two hours, and the catalyst was secured on the honeycomb structure at 550° C. for one hour.

Examples 1 to 6

Catalyst-carrying filters of Examples 1 to 6 were obtained in the same manner as described above, except for setting the pore size of the PM collection layer at 5 μm, setting the porosity of the PM collection layer at 70%, setting the pore size of the gas-outflow-side layer at 15 μm, setting the porosity of the gas-outflow-side layer at 40%, causing the catalyst A to be supported (applied) as the PM removal catalyst, and causing the catalyst A to be supported (applied) as the gas purification catalyst. The catalyst amount ratio, the total catalyst amount, and the like are shown in Table 1.

Example 7

A catalyst-carrying filter of Example was obtained in the same manner as described above, except for setting the pore size of the PM collection layer at 1 μm, setting the porosity of the PM collection layer at 70%, setting the pore size of the gas-outflow-side layer at 15 μm, setting the porosity of the gas-outflow-side layer at 40%, causing the catalyst A to be supported (applied) as the PM removal catalyst, and causing the catalyst A to be supported (applied) as the gas purification catalyst. The catalyst amount ratio, the total catalyst amount, and the like are shown in Table 1.

Example 8

A catalyst-carrying filter of Example 8 was obtained in the same manner as described above, except for setting the pore size of the PM collection layer at 15 μm, setting the porosity of the PM collection layer at 70%, setting the pore size of the gas-outflow-side layer at 15 μm, setting the porosity of the gas-outflow-side layer at 40%, causing the catalyst A to be supported (applied) as the PM removal catalyst, and causing the catalyst A to be supported (applied) as the gas purification catalyst. The catalyst amount ratio, the total catalyst amount, and the like are shown in Table 1.

Example 9

A catalyst-carrying filter of Example 9 was obtained in the same manner as described above, except for setting the pore size of the PM collection layer at 3 μm, setting the porosity of the PM collection layer at 90%, setting the pore size of the gas-outflow-side layer at 15 μm, setting the porosity of the gas-outflow-side layer at 40%, causing the catalyst A to be supported (applied) as the PM removal catalyst, and causing the catalyst A to be supported (applied) as the gas purification catalyst. The catalyst amount ratio, the total catalyst amount, and the like are shown in Table 1.

Examples 10 to 12

A catalyst-carrying filter of Example 10 was obtained in the same manner as described above, except for setting the pore size of the PM collection layer at 5 μm, setting the porosity of the PM collection layer at 70%, setting the pore size of the gas-outflow-side layer at 15 μm, setting the porosity of the gas-outflow-side layer at 40%, causing the catalyst B-2 to be supported (applied) as the PM removal catalyst, and causing the catalyst C-2 to be supported (applied) as the gas purification catalyst. A catalyst-carrying filter of Example 11 was obtained in the same manner as the catalyst-carrying filter of Example 10, except for causing the catalyst B-3 to be supported (applied) as the PM removal catalyst, and causing the catalyst C-3 to be supported (applied) as the gas purification catalyst. A catalyst-carrying filter of Example 12 was obtained in the same manner as the catalyst-carrying filter of Example 10, except for causing the catalyst B-4 to be supported (applied) as the PM removal catalyst, and causing the catalyst C-4 to be supported (applied) as the gas purification catalyst. The catalyst amount ratio, the total catalyst amount, and the like are shown in Table 1.

Examples 13 and 14

A catalyst-carrying filter of Example 13 was obtained in the same manner as described above, except for setting the pore size of the PM collection layer at 5 µm, setting the porosity of the PM collection layer at 70%, setting the pore size of the gas-outflow-side layer at 15 µm, setting the porosity of the gas-outflow-side layer at 40%, causing the catalyst D-1 to be supported (applied) as the PM removal catalyst, and causing the catalyst E-1 to be supported (applied) as the gas purification catalyst. A catalyst-carrying filter of Example 14 was obtained in the same manner as the catalyst-carrying filter of Example 13, except for causing the catalyst D-2 to be supported (applied) as the PM removal catalyst, and causing the catalyst E-2 to be supported (applied) as the gas purification catalyst. The catalyst amount ratio, the total catalyst amount, and the like are shown in Table 1.

Comparative Examples 1 to 5

Catalyst-carrying filters of Comparative Examples 1 to 5 were obtained in the same manner as described above, except for setting the pore size of the PM collection layer at 5 µm, setting the porosity of the PM collection layer at 70% and that of gas-outflow-side layer at 40% respectively, causing the catalyst A to be supported (applied) as the PM removal catalyst, and causing the catalyst A to be supported (applied) as the gas purification catalyst. The catalyst amount ratio, the total catalyst amount, and the like are shown in Table 1.

Comparative Examples 6 and 7

A catalyst-carrying filter of Comparative Example 6 was obtained in the same manner as described above, except for setting the pore size of the PM collection layer at 0.5 µm, setting the porosity of the PM collection layer at 70%, causing the catalyst A to be supported (applied) as the PM removal catalyst, and causing the catalyst A to be supported (applied) as the gas purification catalyst. A catalyst-carrying filter of Comparative Example 7 was obtained in the same manner as the catalyst-carrying filter of Comparative Example 6, except for setting the pore size of the PM collection layer at 17 µm, setting the porosity of the PM collection layer at 70%, causing the catalyst A to be supported (applied) as the PM removal catalyst, and causing the catalyst A to be supported (applied) as the gas purification catalyst. The catalyst amount ratio, the total catalyst amount, and the like are shown in Table 1.

Comparative Examples 8 to 10

A catalyst-carrying filter of Comparative Example 8 was obtained in the same manner as described above, except for setting the pore size of the PM collection layer at 17 µm, setting the porosity of the PM collection layer at 70%, setting the pore size of the gas-outflow-side layer at 15 µm, setting the porosity of the gas-outflow-side layer at 40%, causing the catalyst B-1 to be supported (applied) as the PM removal catalyst, and causing the catalyst C-1 to be supported (applied) as the gas purification catalyst. A catalyst-carrying filter of Comparative Example 9 was obtained in the same manner as the catalyst-carrying filter of Comparative Example 8, except for causing the catalyst B-5 to be supported (applied) as the PM removal catalyst, and causing the catalyst C-5 to be supported (applied) as the gas purification catalyst, and a catalyst-carrying filter of Comparative Example 10 was obtained in the same manner as the catalyst-carrying filter of Comparative Example 8, except for causing the catalyst D-3 to be supported (applied) as the PM removal catalyst, and causing the catalyst E-3 to be supported (applied) as the gas purification catalyst. The catalyst amount ratio, the total catalyst amount, and the like are shown in Table 1.

The following experiments were conducted using the catalyst-carrying filters of Examples 1 to 14 and Comparative Examples 1 to 10.

[1] Regeneration Efficiency Test

The catalyst-coated DPF was connected to a diesel engine (2.0 liter). 8 g/L of PM was deposited on the DPF at 2000 rpm×50 Nm. The exhaust gas temperature was increased by post injection, and the DPF inlet gas temperature was controlled at 650° C. for 10 minutes. After stopping post injection, the DPF was removed. The amount of PM deposited on the DPF was then measured, and the regeneration efficiency (PM combustion efficiency) was calculated from the weight measured before and after the test.

[2] Pressure Loss Due to Soot

The pressure loss across the DPF when 8 g/L of PM was deposited was measured, and the pressure loss when 6 g/L of PM was deposited was evaluated.

[3] Gas Emission

The CO purification efficiency across the DPF was measured during regeneration (post injection).

[4] PM Emission

The DPF was installed in a vehicle equipped with a diesel engine (2.0 liter), and an emission test was conducted in accordance with the European regulation mode. The PM emission was measured to evaluate the collection performance of the DPF.

[5] Measuring Method

The catalyst distributions of the catalyst-coated DPFs of the examples and comparative examples were observed using a scanning electron microscope (SEM). The chemical components were quantitatively analyzed by energy dispersive X-ray spectroscopy (EDX). The integrated value of the catalyst components at each measurement position was taken as the amount of catalyst supported at each measurement position. Specifically, the catalyst distribution was observed at an SEM magnification of 1000. The chemical components were observed by EDX. The chemical components were then analyzed by EDX. The catalyst components were then quantitatively analyzed by EDX. The specimens were sampled from the catalyst-coated DPFs of Examples 1 to 4 and Comparative Examples 1 and 2 (1-1) at about 30 mm each from the inlet and the outlet in the DPF axial direction on upstream side and downstream side respectively as well as at the center in the axial direction corresponding to middle stream portion. The specimens were sampled at the center in the cross section on upstream and downstream side as well as on middle stream. Furthermore, (2) the amount of catalyst on gas-inflow-side was measured at the center in the direction of the thickness of the gas-inflow-side layer and the amount of catalyst on gas-outflow-side was measured upstream in the direction of the thickness thereof; at about 50 µm from the interface between the PM collection layer and gas-outflow-side layer as well as the amount of catalyst on middle stream part was measured about 50 µm from the interface of the gas-outflow-side layer. The average value of the values measured at three locations was taken as the amount of catalyst in each layer.

The experimental results are shown in Table 1.

TABLE 1

| No. | Pore size of collection layer (μm) | Pore size of gas-outflow-side layer (μm) | Porosity of collection layer (%) | Porosity of gas-outflow-side layer (%) | PM removal catalyst | Gas purification catalyst | Catalyst amount ratio (—) |
|---|---|---|---|---|---|---|---|
| Comparative Example 1 | 5 | 15 | 70 | 40 | Catalyst A | Catalyst A | 1 |
| Example 1 | 5 | 15 | 70 | 40 | Catalyst A | Catalyst A | 2 |
| Comparative Example 2 | 5 | 15 | 70 | 40 | Catalyst A | Catalyst A | 1.05 |
| Example 2 | 5 | 15 | 70 | 40 | Catalyst A | Catalyst A | 1.1 |
| Example 3 | 5 | 15 | 70 | 40 | Catalyst A | Catalyst A | 10 |
| Comparative Example 3 | 5 | 15 | 70 | 40 | Catalyst A | Catalyst A | 11 |
| Comparative Example 4 | 5 | 15 | 70 | 40 | Catalyst A | Catalyst A | 2 |
| Example 4 | 5 | 15 | 70 | 40 | Catalyst A | Catalyst A | 2 |
| Example 5 | 5 | 15 | 70 | 40 | Catalyst A | Catalyst A | 2 |
| Example 6 | 5 | 15 | 70 | 40 | Catalyst A | Catalyst A | 2 |
| Comparative Example 5 | 5 | 15 | 70 | 40 | Catalyst A | Catalyst A | 2 |
| Comparative Example 6 | 0.5 | 15 | 70 | 40 | Catalyst A | Catalyst A | 2 |
| Exemple 7 | 1 | 15 | 70 | 40 | Catalyst A | Catalyst A | 2 |
| Example 8 | 15 | 15 | 70 | 40 | Catalyst A | Catalyst A | 2 |
| Comparative Example 7 | 17 | 15 | 70 | 40 | Catalyst A | Catalyst A | 2 |
| Example 9 | 3 | 15 | 70 | 40 | Catalyst A | Catalyst A | 2 |
| Comparative Example 8 | 5 | 15 | 70 | 40 | Catalyst B-1 | Catalyst C-1 | 1 |
| Example 10 | 5 | 15 | 70 | 40 | Catalyst B-2 | Catalyst C-2 | 1 |
| Example 11 | 5 | 15 | 70 | 40 | Catalyst B-3 | Catalyst C-3 | 1 |
| Example 12 | 5 | 15 | 70 | 40 | Catalyst B-4 | Catalyst C-4 | 1 |
| Comparative Example 9 | 5 | 15 | 90 | 40 | Catalyst B-5 | Catalyst C-5 | 1 |
| Example 13 | 5 | 15 | 70 | 40 | Catalyst D-1 | Catalyst E-1 | 2 |
| Example 14 | 5 | 15 | 70 | 40 | Catalyst D-2 | Catalyst E-2 | 2 |
| Comparative Example 10 | 5 | 15 | 70 | 40 | Catalyst D-3 | Catalyst E-3 | 2 |

| No. | Total catalyst amount (g/L) | Ceria amount ratio (—) | Pt amount ratio (—) | Regeneration efficiency (%) | Pressure loss due to soot (kPa) | Gas emission (%) | PM emission (mg/km) |
|---|---|---|---|---|---|---|---|
| Comparative Example 1 | 30 | — | — | 42 | 15 | 100 | 1.0 |
| Example 1 | 30 | — | — | 53 | 16 | 100 | 1.0 |
| Comparative Example 2 | 30 | — | — | 45 | 12 | 100 | 1.0 |
| Example 2 | 30 | — | — | 51 | 14 | 100 | 1.0 |
| Example 3 | 30 | — | — | 57 | 17 | 100 | 1.0 |
| Comparative Example 3 | 30 | — | — | 59 | 18 | 93 | 1.0 |
| Comparative Example 4 | 13 | — | — | 40 | 12 | 92 | 1.0 |
| Example 4 | 15 | — | — | 52 | 14 | 100 | 1.0 |
| Example 5 | 40 | — | — | 56 | 19 | 100 | 1.0 |
| Example 6 | 170 | — | — | 62 | 28 | 100 | 1.0 |
| Comparative Example 5 | 200 | — | — | 65 | 32 | 100 | 1.0 |
| Comparative Example 6 | 30 | — | — | 52 | 32 | 100 | 0.1 |
| Exemple 7 | 30 | — | — | 53 | 17 | 100 | 0.2 |
| Example 8 | 30 | — | — | 54 | 14 | 100 | 4.0 |
| Comparative Example 7 | 30 | — | — | 22 | 13 | 100 | 6.0 |
| Example 9 | 30 | — | — | 55 | 16 | 100 | 0.1 |
| Comparative Example 8 | 30 | 1.1 | — | 44 | 15 | 100 | 1.0 |
| Example 10 | 30 | 1.2 | — | 52 | 15 | 100 | 1.0 |
| Example 11 | 30 | 5 | — | 55 | 16 | 100 | 1.0 |
| Example 12 | 30 | 10 | — | 58 | 15 | 100 | 1.0 |

TABLE 1-continued

| | | | | | | | |
|---|---|---|---|---|---|---|---|
| Comparative Example 9 | 30 | 11 | — | 60 | 16 | 95 | 1.0 |
| Example 13 | 30 | — | 0 | 55 | 16 | 100 | 1.0 |
| Example 14 | 30 | — | 0.2 | 54 | 16 | 100 | 1.0 |
| Comparative Example 10 | 30 | — | 1.2 | 53 | 16 | 100 | 1.0 |

(Consideration 1)

When comparing the DPF of Example 1 (two-layer structure) with the DPF of Comparative Example 1, the regeneration efficiency was increased by changing the catalyst amount ratio from one (=identical catalyst density) to two. Specifically, when using the DPF of Example 1, when the PM collection layer as a gas-inflow-side layer had an average pore size (15 μm or less) smaller than that of the gas-outflow-side layer, soot was collected by the PM collection layer and was not deposited in the gas-outflow-side layer. In this case, the soot combustion rate was increased by increasing the amount of catalyst in the PM collection layer in order to promote combustion of soot so that the regeneration efficiency was improved. On the other hand, the DPF of Comparative Example 1 having a small catalyst amount ratio had a regeneration efficiency of 50% or less. Therefore, since the DPF of Comparative Example 1 must be regenerated at reduced intervals when the DPF of Comparative Example 1 is subjected to repeated regeneration, the DPF must be regenerated at a high frequency during actual use. This means that the fuel consumption significantly increases (i.e., impractical).

The term "catalyst amount ratio" used herein refers to the catalyst density ratio (hereinafter the same).

(Consideration 2)

When comparing the DPFs of Examples 2 and 3 with the DPFs of Comparative Examples 2 and 3, the regeneration efficiency decreased to 50% or less when the catalyst amount ratio was less than 1.1 (Comparative Example 2). The amount of catalyst supported on gas-outflow-side layer significantly decreased when the catalyst amount ratio was more than 10 (Comparative Example 3). Therefore, since CO produced by incomplete combustion during soot regeneration was not sufficiently oxidized in the gas-outflow-side layer, the CO emission (gas emission) during regeneration did not reach 100% (i.e., CO slippage occurred). On the other hand, the DPFs of Examples 2 and 3 showed a high regeneration efficiency and a gas emission of 100%.

(Consideration 3)

When comparing the DPFs of Examples 4 and 5 with the DPFs of Comparative Examples 4 to 6, the regeneration efficiency decreased to less than 50% when the total catalyst amount was less than 15 g/L (Comparative Example 4). Moreover, since the amount of catalyst in the gas-outflow-side layer was insufficient, the gas emission did not reach 100%. When the total catalyst amount was more than 180 g/L (Comparative Example 5), the pores in the gas-inflow-side layer were clogged by the catalyst so that the pressure loss due to soot increased rapidly. When the pressure loss due to soot when 6 g/L of PM is deposited is more than 30 kPa (Comparative Example 6), the output during acceleration decreases during actual use. Therefore, the DPFs of Comparative Examples 4 to 6 are impractical. On the other hand, the DPFs of Examples 4 and 5 showed a high regeneration efficiency and a gas emission of 100%. Moreover, the pressure loss due to soot could be reduced.

(Consideration 4)

When comparing the DPFs of Examples 6 and 7 with the DPFs of Comparative Examples 4 to 6, the permeability decreased when the average pore size of the collection layer was less than 1 μm (Comparative Example 6) so that the permeation resistance of the pores increased rapidly. When the pressure loss due to soot was more than 30 kPa and the average pore size was more than 15 μm (Comparative Example 7), the collection performance decreased so that the PM emission exceeded the Euro-5 regulation value (5 mg/km). Specifically, the DPFs of Comparative Examples 6 and 7 are impractical. On the other hand, the DPFs of Examples 6 and 7 showed a high regeneration efficiency and a gas emission of 100%. Moreover, the pressure loss due to soot could be reduced.

(Consideration 5)

The DPF of Example 9, in which glass fibers having a diameter of 2 to 5 μm and a length of 20 to 100 μm were used for the collection layer, showed an improved collection performance and a reduced PM emission.

(Consideration 6)

When comparing the DPFs of Examples 10 to 12 with the DPFs of Comparative Examples 8 and 9, the regeneration efficiency decreased to less than 40% when the ceria amount ratio was less than 1.2 (Comparative Example 8). When the ceria amount ratio was more than 10 (Comparative Example 9), since the amount of oxygen occlusion catalyst in the gas-outflow-side layer decreased to a large extent, the amount of oxygen became locally insufficient during CO oxidation. As a result, the HC gas emission did not reach 100%. Specifically, the DPFs of Comparative Examples 8 and 9 are impractical. On the other hand, the regeneration efficiency was more than 450% when the ceria amount ratio was 1.2 or more (Examples 10 to 12) in the same manner as in the case of increasing the catalyst amount ratio.

(Consideration 7)

When comparing the DPFs of Examples 13 and 14 with the DPF of Comparative Example 10, a decrease in regeneration efficiency was not observed when the catalyst amount ratio was two and the amount of Pt in the gas-inflow-side layer was decreased (or set at zero) (Examples 13 and 14). Specifically, it was found that Pt does not contribute to regeneration of soot. This means that cost can be reduced by decreasing the amount of Pt so that inexpensive products can be provided. On the other hand, the DPF of Comparative Example 10 showed an equal regeneration efficiency even if the Pt amount ratio was increased to more than one (i.e., the amount of Pt in the gas-inflow-side layer was larger than that of the gas-outflow-side layer). This merely results in an increase in production cost.

The catalyst-carrying filter according to the present invention may be suitably used to collect or purify particulate matter contained in exhaust gas discharged from an internal combustion engine (e.g., diesel engine, ordinary vehicle engine, and large-size vehicle (e.g., truck and bus) engine) or a combustion apparatus.

What is claimed is:

1. A catalyst-carrying filter comprising a honeycomb-structured base material having a plurality of cells that serve as exhaust gas passages and are partitioned by a partition wall formed of a porous ceramic having a number of pores, the partition wall including a gas-inflow-side layer and a gas-outflow-side layer, one open end and another open end of the plurality of cells being alternately plugged by plugging sections;

the gas-inflow-side layer including a PM collection and PM removal catalyst layer that has an average pore size of 1 to 15 μm so as to collect particulate matter and supports or is coated with an oxidizing catalyst for promoting oxidation of particulate matter contained in exhaust gas; and the gas-outflow-side layer including a gas purification catalyst layer that supports or is coated with a gas purification catalyst that promotes oxidation of unburned gas, wherein an amount of oxidizing catalyst supported on the PM collection and PM removal catalyst layer is larger than that of the gas purification catalyst layer by a factor of 1.05 to 10 and wherein an amount of noble metal contained in the PM collection and PM removal catalyst layer is smaller than an amount of noble metal contained in the gas purification catalyst layer.

2. The catalyst-carrying filter according to claim 1, wherein a total amount of oxidizing catalyst supported on the PM collection and PM removal catalyst layer and the gas purification catalyst layer is 15 to 180 g/L.

3. The catalyst-carrying filter according to claim 1, wherein the PM collection and PM removal catalyst layer does not contain a noble metal.

4. The catalyst-carrying filter according to claim 1, wherein an amount of Ce contained in the PM collection and PM removal catalyst layer is larger than an amount of Ce contained in the gas purification catalyst layer by a factor of 1.2 to 10.

5. The catalyst-carrying filter according to claim 1, wherein the PM collection and PM removal catalyst layer is formed by causing a ceramic having an aspect ratio of five or more to be coated with the PM removal catalyst.

6. The catalyst-carrying filter according to claim 1, wherein the PM collection and PM removal catalyst layer has an average pore size smaller than that of the gas purification catalyst layer.

7. The catalyst-carrying filter according to claim 1, wherein the catalyst-carrying filter is produced by separately coating the PM collection and PM removal catalyst layer and the gas purification catalyst layer with the PM removal catalyst and the gas purification catalyst.

8. The catalyst-carrying filter according to claim 1, wherein the catalyst-carrying filter is produced by coating the PM collection and PM removal catalyst layer with the PM removal catalyst from an inlet side, and coating the gas purification catalyst layer with the gas purification catalyst from an outlet side.

9. The catalyst-carrying filter according to claim 1, wherein the catalyst-carrying filter is produced by respectively coating the PM collection and PM removal catalyst layer and the gas purification catalyst layer with the PM removal catalyst and the gas purification catalyst from an inlet side.

10. The catalyst-carrying filter according to claim 1, wherein the amount of oxidizing catalyst supported on the PM collection and PM removal catalyst layer is larger than that of the gas purification catalyst layer by a factor of 2 to 10.

11. The catalyst-carrying filter according to claim 1, wherein regeneration efficiency of the catalyst-carrying filter ranges from 54% to 62%.

12. The catalyst-carrying filter according to claim 1, pressure loss of the catalyst-carrying filter due to soot is not greater than 28 kPa.

* * * * *